United States Patent
Risbeck et al.

(10) Patent No.: US 12,298,754 B2
(45) Date of Patent: May 13, 2025

(54) BUILDING EQUIPMENT CONTROL SYSTEM WITH MODULAR MODELS

(71) Applicant: Tyco Fire & Security GmbH, Neuhausen am Rheinfall (CH)

(72) Inventors: Michael J. Risbeck, Madison, WI (US); Chenlu Zhang, Milwaukee, WI (US); Zhanhong Jiang, Milwaukee, WI (US); Young M. Lee, Old Westbury, NY (US); Santle Camilus Kulandai Samy, Sunnyvale, CA (US); Jaume Amores, Cork (IE); Saman Cyrus, Fitchburg, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 39 days.

(21) Appl. No.: 17/710,706

(22) Filed: Mar. 31, 2022

(65) Prior Publication Data
US 2023/0315079 A1    Oct. 5, 2023

(51) Int. Cl.
G05B 23/02     (2006.01)
G05B 13/02     (2006.01)
G05B 13/04     (2006.01)

(52) U.S. Cl.
CPC ....... *G05B 23/0254* (2013.01); *G05B 13/029* (2013.01); *G05B 13/048* (2013.01)

(58) Field of Classification Search
None
See application file for complete search history.

(56) References Cited

U.S. PATENT DOCUMENTS

| | | |
|---|---|---|
| 9,447,985 B2 | 9/2016 | Johnson |
| 10,871,756 B2 | 12/2020 | Johnson et al. |
| 10,908,578 B2 | 2/2021 | Johnson et al. |
| 10,921,768 B2 | 2/2021 | Johnson et al. |
| 11,156,978 B2 | 10/2021 | Johnson et al. |
| 2003/0055798 A1 | 3/2003 | Hittle et al. |
| 2009/0083583 A1 | 3/2009 | Seem et al. |
| 2011/0178977 A1 | 7/2011 | Drees |

(Continued)

FOREIGN PATENT DOCUMENTS

| | | |
|---|---|---|
| CA | 2957726 A1 | 3/2016 |
| CA | 3043996 A1 | 2/2018 |

(Continued)

OTHER PUBLICATIONS

Afram et al., "Theory and Application of HVAC Control Systems—A review of Model Predictive Control (MPC)," Building and Environment, Feb. 2014, vol. 72 (pp. 343-355).

(Continued)

*Primary Examiner* — Santosh R Poudel
(74) *Attorney, Agent, or Firm* — Foley & Lardner LLP

(57) ABSTRACT

A method includes obtaining a fault prediction model for building equipment, predicting, with the fault prediction model, both (i) whether a fault will occur during a first prediction bin and (ii) whether a fault will occur during a second prediction bin, performing a first mitigating action for the building equipment if the fault is predicted to occur during the first prediction bin, and performing a second mitigating action for the building equipment if the fault is predicted to occur during the second prediction bin.

16 Claims, 20 Drawing Sheets

(56) References Cited

U.S. PATENT DOCUMENTS

| | | | |
|---|---|---|---|
| 2013/0232094 A1* | 9/2013 | Anderson | G05B 23/0281 706/12 |
| 2014/0222394 A1 | 8/2014 | Drees et al. | |
| 2014/0297606 A1* | 10/2014 | Li | G06F 16/283 707/693 |
| 2014/0316743 A1 | 10/2014 | Drees et al. | |
| 2015/0227870 A1 | 8/2015 | Noboa et al. | |
| 2016/0169572 A1 | 6/2016 | Noboa et al. | |
| 2016/0370258 A1 | 12/2016 | Perez | |
| 2017/0249534 A1* | 8/2017 | Townsend | G06V 10/82 |
| 2017/0276571 A1 | 9/2017 | Vitullo et al. | |
| 2017/0357225 A1* | 12/2017 | Asp | G06Q 50/06 |
| 2018/0087790 A1 | 3/2018 | Perez | |
| 2018/0187909 A1 | 7/2018 | Drees et al. | |
| 2018/0284701 A1 | 10/2018 | Salsbury et al. | |
| 2018/0373234 A1* | 12/2018 | Khalate | G05B 23/0229 |
| 2019/0034309 A1 | 1/2019 | Nayak et al. | |
| 2019/0146431 A1 | 5/2019 | Nayak et al. | |
| 2019/0302709 A1 | 10/2019 | Vitullo | |
| 2019/0346817 A1 | 11/2019 | Perez | |
| 2019/0385070 A1 | 12/2019 | Lee et al. | |
| 2020/0072373 A1 | 3/2020 | Noboa et al. | |
| 2020/0233391 A1 | 7/2020 | Ma et al. | |
| 2020/0241051 A1 | 7/2020 | Sridharan et al. | |
| 2020/0326666 A1 | 10/2020 | Salsbury et al. | |
| 2021/0010702 A1 | 1/2021 | Hjortland | |
| 2021/0190354 A1 | 6/2021 | Llopis et al. | |
| 2021/0191378 A1 | 6/2021 | Amores et al. | |
| 2021/0191379 A1 | 6/2021 | Llopis et al. | |
| 2021/0223768 A1 | 7/2021 | Khalate et al. | |
| 2021/0223769 A1 | 7/2021 | Khalate et al. | |
| 2021/0262689 A1 | 8/2021 | Shinde et al. | |
| 2021/0271996 A1 | 9/2021 | Horgan et al. | |
| 2021/0312351 A1 | 10/2021 | Pourmohammad et al. | |
| 2021/0341165 A1 | 11/2021 | Pierson et al. | |
| 2022/0034543 A1 | 2/2022 | Alanqar et al. | |
| 2022/0035357 A1 | 2/2022 | Elbsat et al. | |
| 2022/0199241 A1* | 6/2022 | Aluy | G16H 10/60 |
| 2022/0261673 A1* | 8/2022 | Okawa | G06N 3/08 |
| 2022/0292374 A1* | 9/2022 | Mozano | G06N 20/00 |
| 2022/0333823 A1* | 10/2022 | Vettigli | F24H 15/104 |
| 2023/0275799 A1* | 8/2023 | Boldt | H04L 41/0654 709/224 |
| 2023/0281472 A1* | 9/2023 | Asghari | G06F 1/28 706/12 |

FOREIGN PATENT DOCUMENTS

| | | |
|---|---|---|
| EP | 1 156 286 A2 | 11/2001 |
| EP | 3 186 687 A4 | 7/2017 |
| EP | 3 497 377 A1 | 6/2019 |
| WO | WO-2012/161804 A1 | 11/2012 |
| WO | WO-2013/130956 A1 | 9/2013 |
| WO | WO-2022002357 A1 * | 1/2022 ......... H04L 41/0622 |

OTHER PUBLICATIONS

Ahn et al., "Optimal Control Development for Chilled Water Plants Using a Quadratic Representation," Energy and Buildings, Apr. 2001, vol. 33, No. 4 (pp. 371-378).

Burer et al., "Non-convex Mixed-Integer Nonlinear Programming: A Survey," Surveys in Operations Research and Management Science, Jul. 2012, vol. 17, No. 2 (pp. 97-106).

Cantoni, A., "Optimal Curve Fitting with Piecewise Linear Functions," IEEE Transactions on Computers, Jan. 1971, vol. 20, No. (pp. 59-67).

Corbin et al., "A Model Predictive Control Optimization Environment for Real-Time Commercial Building Application," Journal of Building Performance Simulation, 2013, (Published online: Jan. 11, 2012) vol. 6, No. 3 (pp. 159-174).

Drgona et al., "All you Need to Know about Model Predictive Control for Buildings," Annual Reviews in Control, 2020, vol. 50 (pp. 190-232).

EPO Notice of Opposition to a European Patent issued in Appl. Ser. No. EP 16165681.4 dated May 2, 2023 (48 pages).

EPO Notice of Opposition to a European Patent issued in Appl. Ser. No. EP 16165681.4 dated May 2, 2023 (51 pages).

EPO Notice of Opposition to a European Patent with Consolidated List issued in EP Appl. Ser. No. 16165681.4 dated May 2, 2023 (4 pages).

EPO Office Action on EP Appl. Ser. No. 16165681.4 dated Apr. 6, 2021 (7 pages).

Extended European Search Report on EP Appl. Ser. No. 16165681.4 dated Oct. 20, 2016 (5 pages).

Extended European Search Report on EP Appl. Ser. No. 22177772.5 dated Sep. 26, 2022 (11 pages).

Hackner, J.R., "HVAC system dynamics and energy use in existing buildings," Doctoral Dissertation, University of Madison, Wisconsin, 1984 (174 pages).

Haves et al., "Model Predictive Control of HVAC Systems: Implementation and Testing at the University of California, Merced," Technical Report, U.S. Department of Energy Office of Scientific and Technical Information, Jun. 29, 2010 (140 pages).

Huang et al., "A New Model Predictive Control Scheme for Energy and Cost Savings in Commercial Buildings: An Airport Terminal Building Case Study," Building and Environment, Jul. 2015, vol. 89 (pp. 203-216).

Kelman et al., "Analysis of Local Optima in Predictive Control for Energy Efficient Buildings," Journal of Building Performance Simulation, Apr. 16, 2012, vol. 6, No. 3 (pp. 236-255).

Koehler et al., "Building Temperature Distributed Control via Explicit MPC and 'Trim and Respond' Methods," European Control Conference (ECC), Jul. 17-19, 2013, Zurich, Switzerland (pp. 4334-4339).

Kwadzogah et al., "Model Predictive Control for HVAC Systems—A Review," 2013 IEEE International Conference on Automation Science and Engineering, Model Predictive Control for HVAC Systems—A Review, 2013 IEEE International Conference on Automation Science and Engineering (CASE), Madison, WI, United States, Aug. 17- 20, 2013 (pp. 442-447).

Mckenna et al., "A TRNSYS model of a building HVAC system with GSHP and PCM thermal energy storage—component modelling and validation," Proceedings of BS2013: 13th Conference of International Building Performance Simulation Association, Chambéry, France, Aug. 26-28, 2013 (pp. 3336-3343).

Mossolly et al., "Optimal Control Strategy for a Multizone Air Conditioning System Using a Genetic Algorithm," Energy, Jan. 2009, vol. 34, No. 1 (pp. 58-66).

Nassif et al., "Optimization of HVAC Control System Strategy Using Two-Objective genetic Algorithm," International Journal of HVA C&R Research, vol. 11, No. 3 (pp. 459-486).

Sourbon et al., "Dynamic Thermal Behaviour of Buildings with Concrete Core Activation," Dissertation, Arenberg Doctoral School of Science, Engineering & Technology, Katholieke Universiteit Leuven—Faculty of Engineering Celestijnenlaan: 300A box 2421, B-3001 Heverlee (Belgium) Sep. 2012 (416 pages).

Stluka et al., "Energy Management for Buildings and Microgrids," 2011 50th IEEE Conference on Decision and Control and European Control Conference (CDCECC) Orlando, FL, USA, Dec. 12-15, 2011 (pp. 5150-5157).

Strurznegger, D., "Model Predictive Building Climate Control, Steps Towards Practice," Doctoral Thesis, Automatic Control Laboratory, Zurich, Switzerland, 2014 (176 pages).

Sun et al., Optimal Control of Building HVAC&R Systems Using Complete Simulation-Based Sequential Quadratic Programming (CSB-SQP), Building and Environment, May 2005, vol. 40, No. 5 (pp. 657-669).

Third Party Observation Report on EP Appl. Ser. No. 16165681.4 dated Jan. 15, 2020 (8 pages).

Third Party Observation Report on EP Appl. Ser. No. 16165681.4 dated Oct. 5, 2018 (6 pages).

Verhelst et al., "Study of the Optimal Control Problem Formulation for Modulating Air-to-Water Heat Pumps Connected to a Residential Floor Heating System," Energy and Buildings, Feb. 2012, vol. 45 (pp. 43-53).

(56) References Cited

OTHER PUBLICATIONS

Verhelst, C., "Model Predictive Control of Ground Coupled Heat Pump Systems in Office Buildings," Dissertation, Arenberg Doctoral School of Science, Engineering & Technology, Katholieke Universiteit Leuven—Faculty of Engineering Celestijnenlaan : 300A box 2421, B-3001 Heverlee (Belgium) Apr. 20, 2012 (316 pages).
Wang et al., "Model-Based Optimal Control of VAV Air-Conditioning System Using Genetic Algorithm," Building and Environment, Aug. 2000, vol. 35, No. 6 (pp. 471-487).
Wang et al., "Supervisory and Optimal Control of Building HVAC Systems: A Review," HVAC&R Research, Jan. 2008, vol. 14, No. 1 (pp. 3-32).
Xi et al., "Support Vector Regression Model Predictive Control on a HVAC Plant," Control Engineering Practice, Aug. 2007, vol. 15, No. 8 (pp. 897-908).
Yao et al., "Global Optimization of a Central Air-Conditioning System Using Decomposition—Coordination Method," Energy and Buildings, May 2010, vol. 42, No. 5 (pp. 570-583).
U.S. Appl. No. 17/523,567, filed Nov. 10, 2021, Johnson Controls Tyco IP Holdings LLP.
U.S. Appl. No. 17/540,725, filed Dec. 2, 2021, Johnson Controls Tyco IP Holdings LLP.
U.S. Appl. No. 17/665,987, filed Feb. 7, 2022, Johnson Controls Tyco IP Holdings LLP.
U.S. Appl. No. 17/710,443, filed Mar. 31, 2022, Johnson Controls Tyco IP Holdings LLP.
U.S. Appl. No. 17/710,597, filed Mar. 31, 2022, Johnson Controls Tyco IP Holdings LLP.
U.S. Appl. No. 17/710,706, filed Mar. 31, 2022, Johnson Controls Tyco IP Holdings LLP.
Coolinglogic, "CoolingLogic: Up early, saving billions." URL: http://coolinglogic.com/documents/MarketingFlyer_FINAL_HiRes8.5x11.pdf, retrieved from internet Oct. 27, 2022 (1 page).
Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).
Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).
Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).
Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).
Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).
Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).
Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).
Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).
Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).
Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).
Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).
Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).
Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).
Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).
Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).
Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).
Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).
Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).
Johnson Solid State LLC, "Building Automation Gui," URL: http://cooljohnson.com/Video/Building_Automation/Confidential_Customer_BLD_2/Building_Automation_GUI.mp4, retrieved from internet Oct. 27, 2022 (24 pages).
Johnson Solid State LLC, "Cooling Logic Overview," URL: http://coolinglogic.com/documents/CoolingLogic_Overview_High_Quality.mp4, retrieved from internet Oct. 27, 2022 (16 pages).
Johnson Solid State LLC, "So what is CoolingLogic™?" URL: http://coolinglogic.com/Coolinglogic-How-it-Works.html, retrieved from the internet Oct. 27, 2022 (3 pages).
Johnson, David, "A Method to Increase HVAC System Efficiency And Decrease Energy Consumption," White Paper: Johnson Solid State, LLC, URL: http://coolinglogic.com/documents/16102106_White_Paper_High_Resolution_Protected.pdf, Sep. 24, 2016 (51 pages).
Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).
Johnson, David, "Excel Rehabilitation Building Automation: Building Automation System User Manual ," URL: http://cooljohnson.com/Building-Automation-Systems-Michigan/Waterford-Michigan/Building-Automation-System-Excel-Manual.html, 2012 (10 pages).
Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).

(56) References Cited

OTHER PUBLICATIONS

Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).

Liang et al., "Partial Domain Adaption Based Prediction Calibration Methodology for Fault Detection and Diagnosis of Chillers Under Variable Operational Condition Variables," Building and Environment, Jun. 2022, vol. 217 (21 pages).

Yan et al., "Chiller Faults Detection and Diagnosis with Sensor Network and Adaptive 1D CNN," Digital Communications and Networks, 2022, 8 (pp. 531-539).

Yan et al., "Deep Learning Technology for Chiller Faults Diagnosis," 2019 IEEE International Conference on Dependable, Autonomic and Secure Computing, International Conference on Pervasive Intelligence and Computing, International Conference on Cloud and Big Data Computing, International Conference on Cyber Science and Technology Congress (DASC/PiCom/CBDCom/CyberSciTech), Fukuoka, Japan, 2019 (pages).

Yan et al., "Generative Adversarial Network for Fault Detection Diagnosis of Chillers," Building and Environment, Apr. 2020, vol. 172 (19 pages).

Yan, K., "Chiller Fault Detection and Diagnosis with Anomaly Detective Generative Adversarial Network," Building and Environment, May 2021, vol. 201 (12 pages).

Zhu et al., "Transfer Learning Based Methodology for Migration and Application of Fault Detection and Diagnosis Between Building Chillers for Improving Energy Efficiency," Building and Environment, Aug. 2021, vol. 200 (16 pages).

\* cited by examiner

BUILDING EQUIPMENT CONTROL SYSTEM WITH MODULAR MODELS

BACKGROUND

The present disclosure relates generally to building equipment such as heating, ventilation, or cooling (HVAC) equipment, and to building management systems for use with the same. The present disclosure relates more particularly to fault detection for connected equipment in a building management system. A building management system (BMS) is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

HVAC equipment and other devices in a BMS operate to affect environmental conditions in buildings (temperature, humidity, air quality, illumination levels, etc.) in order to provide comfortable conditions for occupants. Systems and devices in a BMS often generate temporal or time-series data that can be analyzed to determine the performance of the BMS and the various components thereof and/or predict future events such as faults, errors, malfunctions, etc. of the building equipment. For example, data can be examined and alert a user to repair the fault before it becomes more severe when the monitored system or process begins to degrade in performance, or to provide other advantageous technical benefits. However, many fault detection or prediction approaches are dependent on pre-existence of a robust set of historical data with multiple instances of different types of fault events. Such robust data is often not available in practice.

SUMMARY

One implementation of the present disclosure is a method for predicting and mitigating faults in building equipment. The method includes obtaining a fault prediction model, predicting, with the fault prediction model, whether a fault will occur for a first prediction bin and whether a fault will occur for a second prediction bin, performing a first mitigating action for the building equipment if the fault is predicted to occur during the first prediction bin, and performing a second mitigating action for the building equipment if the fault is predicted to occur during the second prediction bin.

In some embodiments, the method may include training the fault prediction model using training data relating to the building equipment, the method further may include preprocessing the training data. Preprocessing the training data may include calculating synthetic features based on chiller fault rules. In some embodiments, preprocessing the training data includes resampling and interpolating to achieve a constant sample rate for a plurality of variables represented in the training data. In some embodiments, preprocessing the training data includes splitting the training data into rolling sequences corresponding to different segments of time, the different segments of time having a same duration.

In some embodiments, the fault prediction model includes an embedder and an autoencoder. The method may include providing composite training of the embedder and the autoencoder. The method may include modularly constructing the fault prediction model by combining (1) an autoencoder selected from a first group may include a principle component analysis model, a long short-term memory network, a feedforward network, and a convolutional network with (2) a classifier selected from a second group may include a Gaussian classifier, a feedforward model, and an XGBoost model. The method may include constructing a second fault prediction model using different selections from the first group and the second group as compared to the fault prediction model.

Another implementation of the present disclosure is one or more non-transitory computer-readable media storing program instructions, that, when executed by one or more processors, cause the one or more processors to perform operations. The operations include providing a fault prediction model for building equipment, predicting, with the fault prediction model at a current time, both (i) whether a fault will occur for a first prediction bin and (ii) whether a fault will occur for a second prediction bin, performing a first mitigating action relating to the building equipment if the fault is predicted to occur for the first prediction bin, and performing a second mitigating action relating to the building equipment if the fault is predicted to occur for the second prediction bin.

In some embodiments, the operations further include training the fault prediction model using training data relating to the building equipment. The operations further may include preprocessing the training data. In some embodiments, preprocessing the training data includes calculating synthetic features based on chiller fault rules. In some embodiments, preprocessing the training data includes resampling and interpolating to achieve a constant sample rate for a plurality of variables represented in the training data. In some embodiments, preprocessing the training data includes splitting the training data into rolling sequences corresponding to different segments of time, the different segments of time have a same duration.

In some embodiments, the fault prediction model includes an embedder and an autoencoder, and training the fault prediction model includes providing composite training of the embedder and the autoencoder. In some embodiments, the operations further may include modularly constructing the fault prediction model by combining (1) an autoencoder selected from a first group may include a principle component analysis model, a long short-term memory network, a feedforward network, and a convolutional network with (2) a classifier selected from a second group may include a Gaussian classifier, a feedforward model, and an XGBoost model. The operations also may include constructing a second fault prediction model using different selections from the first group and the second group as compared to the fault prediction model.

Another implementation of the present disclosure is a unit of building equipment including one or more processors and one or more non-transitory computer-readable media storing program instructions, that, when executed by the one or more processors, cause the one or more processors to perform operations. The operations may include providing a fault prediction model, predicting, with the fault prediction model at a current time, both (i) whether a fault of the unit of building equipment will occur for a first prediction bin extending from the current time to a first future time and (ii) whether a fault of the unit of building equipment will occur for a second prediction bin extending from the first future time to a second future time, performing a first mitigating action for the unit of building equipment if the fault is predicted to occur for the first prediction bin, and performing a second mitigating action for the unit of building equipment if the fault is predicted to occur for the second prediction bin.

In some embodiments, the first mitigating action includes changing a first operating parameter of the unit of building equipment and the second mitigating action includes sending an alert from the unit of building equipment. The operations also may include modularly constructing the fault prediction model by combining (1) an autoencoder selected from a first group may include a principle component analysis model, a long short-term memory network, a feedforward network, and a convolutional network with (2) a classifier selected from a second group may include a Gaussian classifier, a feedforward model, and an XGBoost model.

Other aspects, inventive features, and advantages of the devices and/or processes described herein, as defined solely by the claims, will become apparent in the detailed description set forth herein and taken in conjunction with the accompanying drawings.

DETAILED DESCRIPTION

Following below are more detailed descriptions of various concepts related to, and implementations of systems, methods, and apparatuses for generating time varying performance indications for connected equipment in a building management system. Before turning to the more detailed descriptions and figures, which illustrate the exemplary embodiments in detail, it should be understood that the application is not limited to the details or methodology set forth in the descriptions or illustrated in the figures. It should also be understood that the terminology is for the purpose of description only and should not be regarded as limiting in any way.

Building HVAC Systems and Building Management Systems

Figure 1:
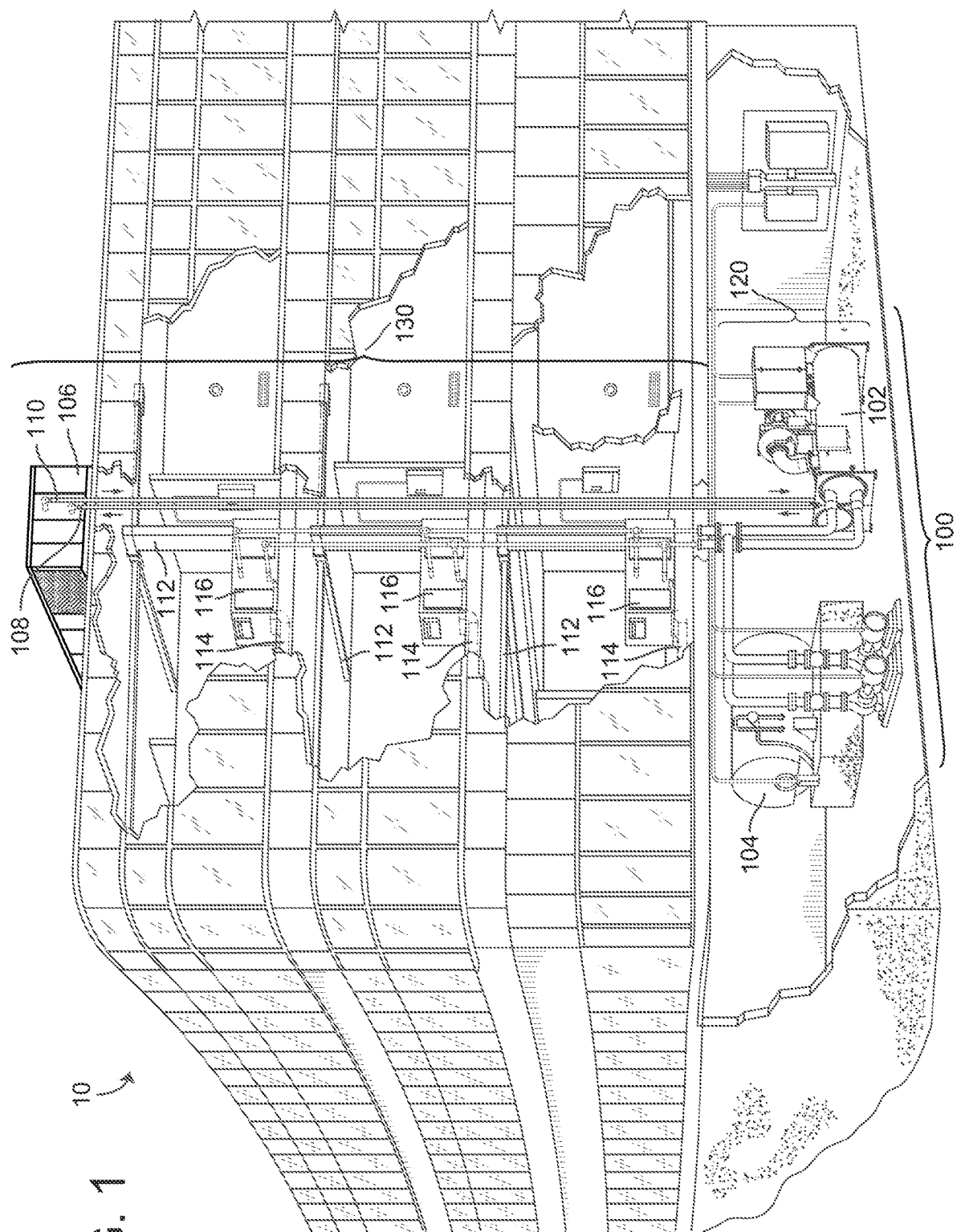
FIG. 1 is a drawing of a building equipped with a HVAC system, according to some embodiments.
Figure 2:
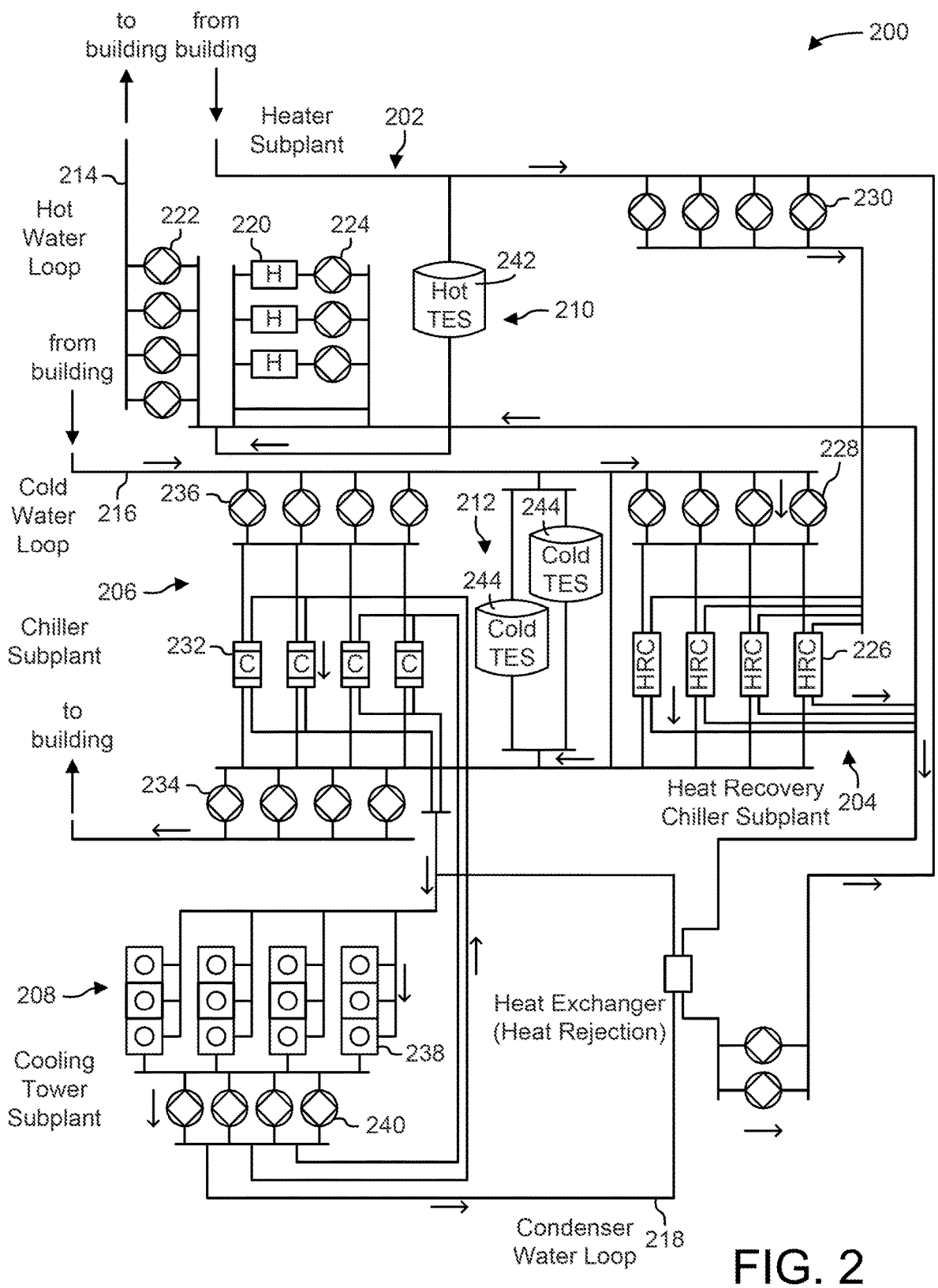
FIG. 2 is a schematic diagram of a waterside system which can be used in conjunction with the building of FIG. 1, according to some embodiments.
Figure 3:
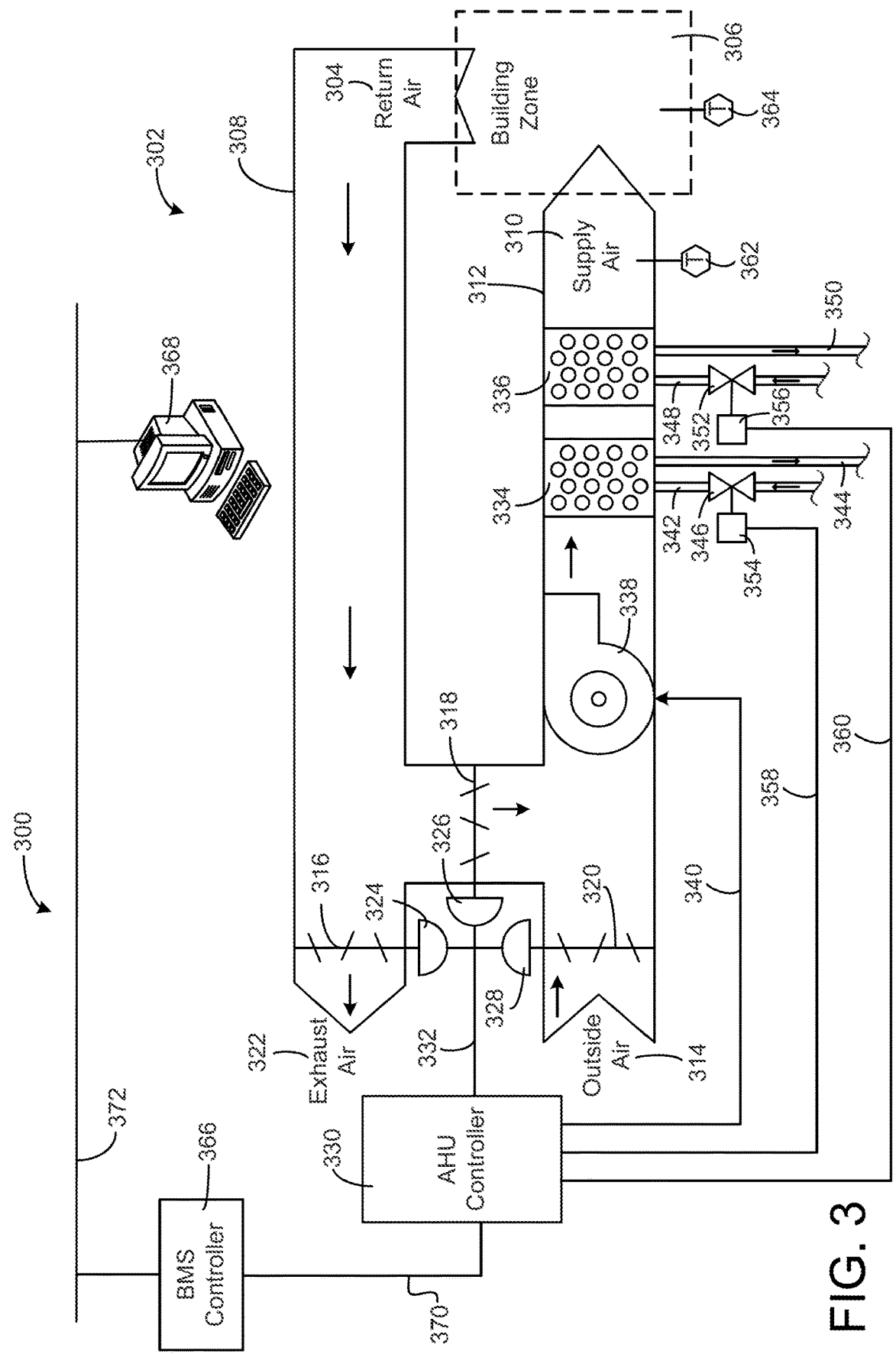
FIG. 3 is a schematic diagram of an airside system which can be used in conjunction with the building of FIG. 1, according to some embodiments.
Figure 4:
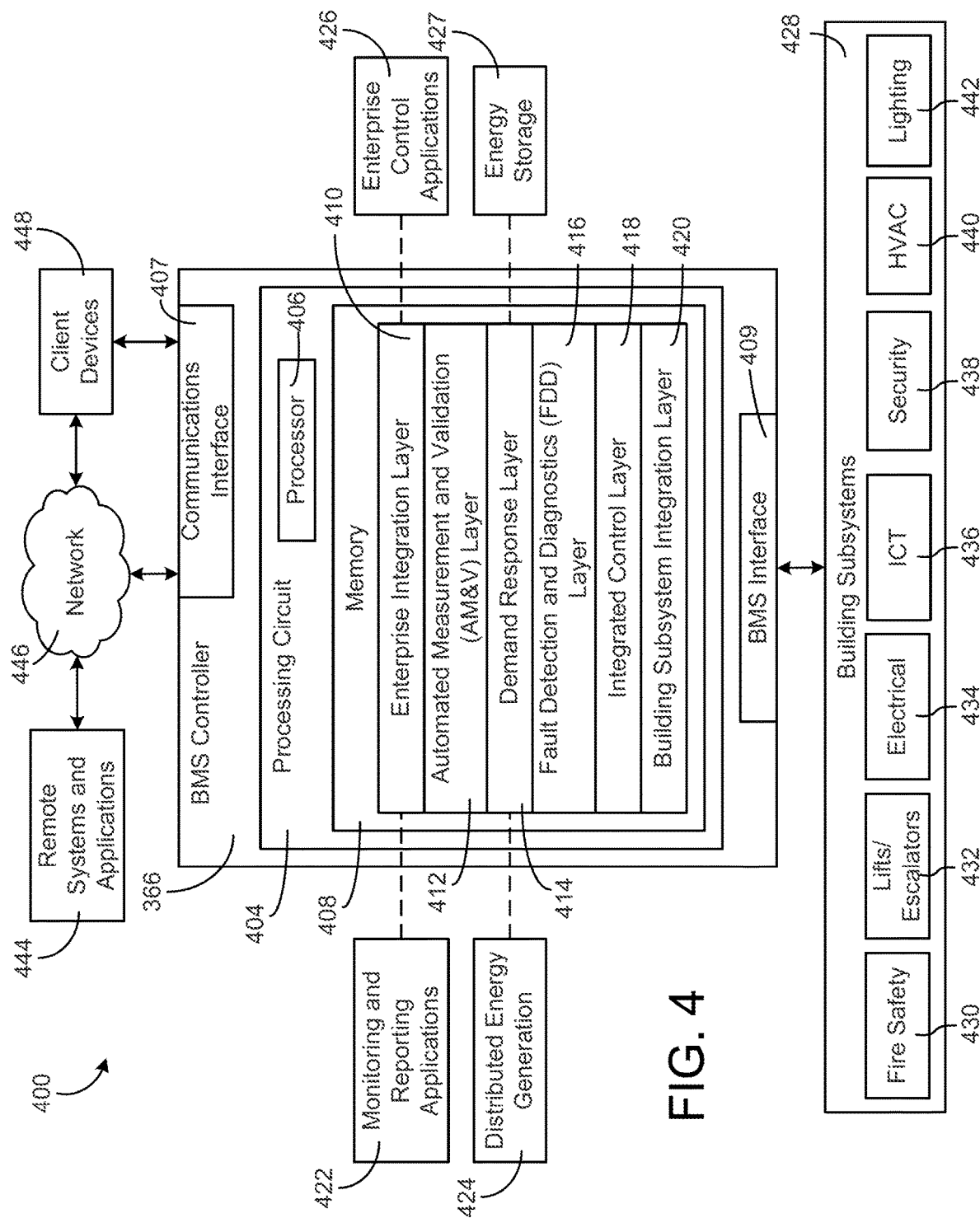
FIG. 4 is a block diagram of a building management system (BMS) which can be used to monitor and control the building of FIG. 1, according to some embodiments.
Figure 5:
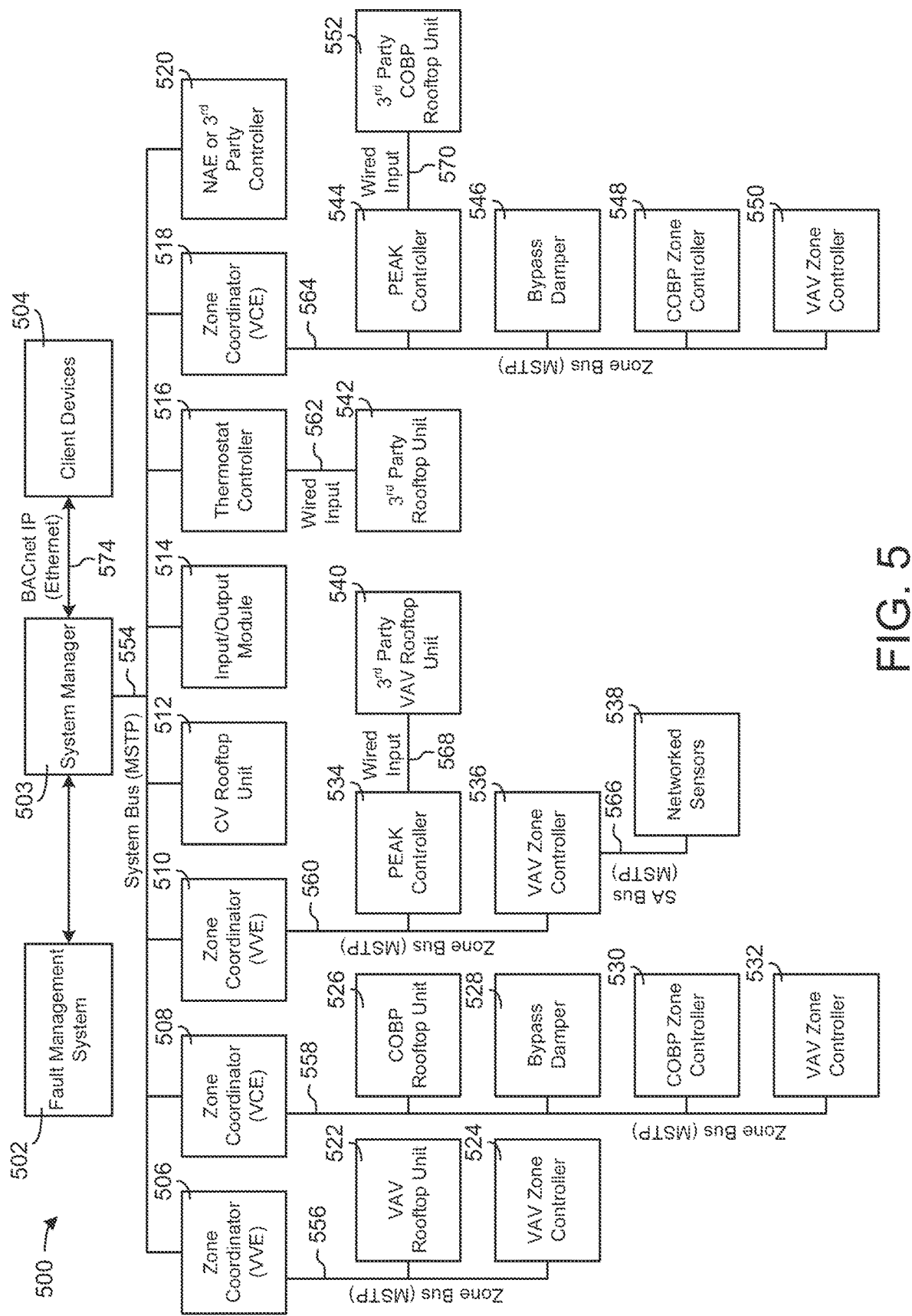
FIG. 5 is a block diagram of another BMS which can be used to monitor and control the building of FIG. 1 and includes a fault management system, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building 10 and HVAC System 100

Referring particularly to FIG. 1, a perspective view of building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2 and 3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System 200

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System 300

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management System 400

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2 and 3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, thermostats, and other devices for controlling the temperature, humidity, airflow, or other variable conditions within building 10. Lighting subsystem 442 can include any number of light fixtures, ballasts, lighting sensors, dimmers, and/or other devices configured to controllably adjust the amount of light provided to a building space. Security subsystem 438 can include occupancy sensors, video surveillance cameras, digital video recorders, video processing servers, intrusion detection devices, access control devices and servers, and/or other security-related devices.

Still referring to FIG. 4, BMS controller 366 is shown to include a communications interface 407 and a BMS interface 409. Communications interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Communications interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Communications interfaces 407 and/or BMS interface 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via communications interfaces 407 and/or BMS interface 409 can be direct (e.g., local wired or wireless communications) or via a communications network 446 (e.g., a WAN, the Internet, a cellular network, etc.). For example, communications interfaces 407 and/or BMS interface 409 can include an Ethernet card and port for sending and receiving data via an Ethernet-based communications link or network. In another example, communications interfaces 407 and/or BMS interface 409 can include a Wi-Fi transceiver for communicating via a wireless communications network. In another example, one or both of communications interfaces 407 and BMS interface 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via communications interfaces 407 and/or BMS interface 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at communications interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs (e.g., internal to building 10, external to building 10, etc.) such as temperature, carbon dioxide levels, relative humidity levels, air quality sensor outputs, occupancy sensor outputs, room schedules, weather conditions, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints, etc.) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions can be edited or adjusted by a user (e.g., via a graphical user interface, etc.) so that the control actions initiated in response to demand inputs can be tailored for the user's application, desired comfort level, particular building equipment, and/or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and/or when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, and/or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage, etc.) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Building Management System 500

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment. In some embodiments, the building management system includes a fault management system.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a fault management system 502; a system manager 503; several zone coordinators 506, 508, 510 and 518; and several zone controllers 524, 530, 532, 536, 548, and 550. System manager 503 can monitor various data points in BMS 500 and report monitored variables to fault management system 502. System manager 503 can communicate with client devices 504 (e.g., user devices, desktop computers, laptop computers, mobile devices, etc.) via a data communications link 574 (e.g., BACnet IP, Ethernet, wired or wireless communications, etc.). System manager 503 can provide a user interface to client devices 504 via data communications link 574. The user interface may allow users to monitor and/or control BMS 500 via client devices 504.

In some embodiments, system manager 503 is connected with zone coordinators 506-510 and 518 via a system bus 554. System manager 503 can be configured to communicate with zone coordinators 506-510 and 518 via system bus 554 using a master-slave token passing (MSTP) protocol or any other communications protocol. System bus 554 can also connect system manager 503 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 503 and can be connected directly to system bus 554. Other RTUs can communicate with system manager 503 via an intermediate device. For example, a wired input 562 can connect a third-party RTU 542 to thermostat controller 516, which connects to system bus 554.

System manager 503 can provide a user interface for any device containing an equipment model. Devices such as zone coordinators 506-510 and 518 and thermostat controller 516 can provide their equipment models to system manager 503 via system bus 554. In some embodiments, system manager 503 automatically creates equipment models for connected devices that do not contain an equipment model (e.g., IOM 514, third party controller 520, etc.). For example, system manager 503 can create an equipment model for any device that responds to a device tree request. The equipment models created by system manager 503 can be stored within system manager 503. System manager 503 can then provide a user interface for devices that do not contain their own equipment models using the equipment models created by system manager 503. In some embodiments, system manager 503 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Fault Management System for Connected Equipment

Figure 6:
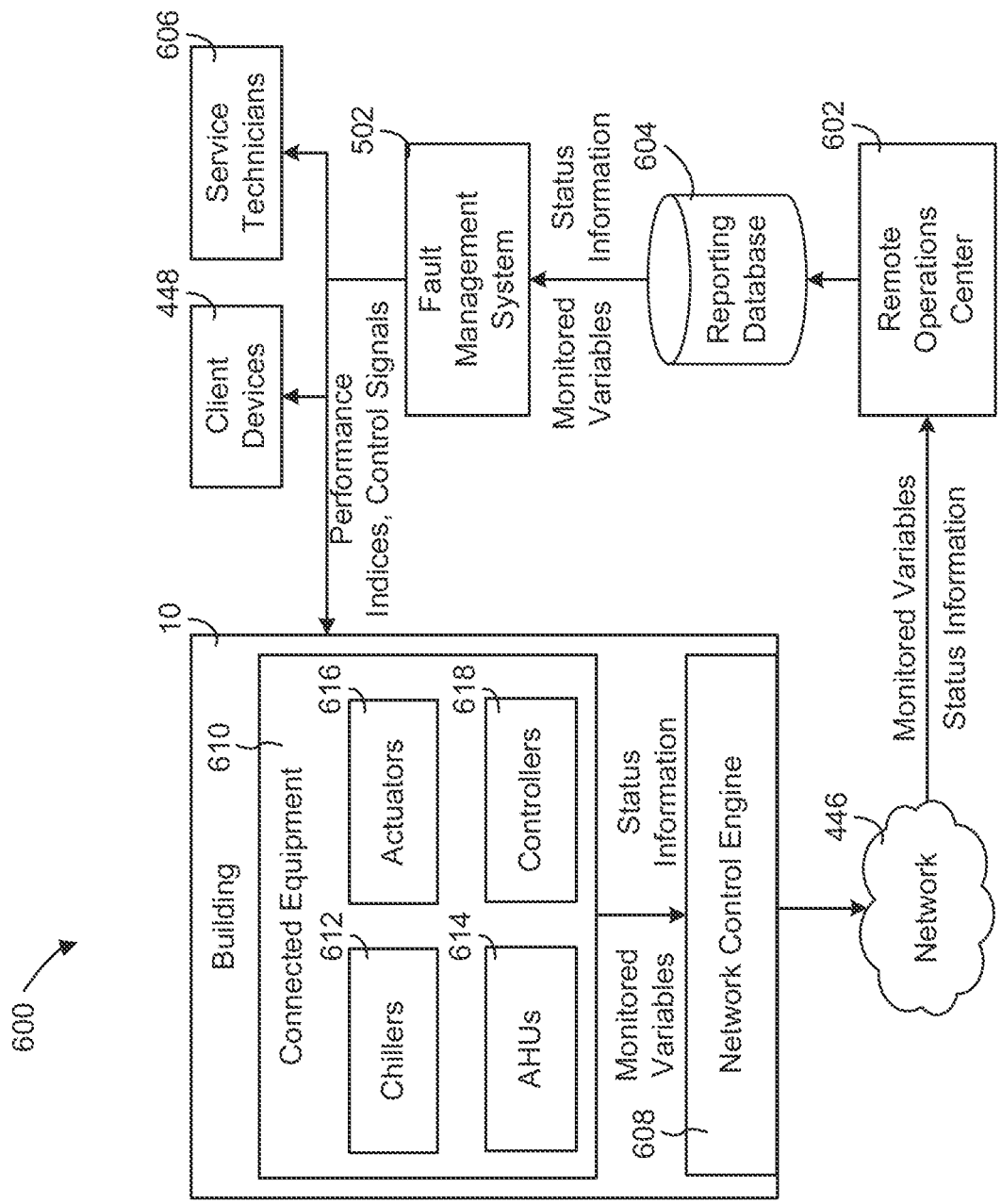
FIG. 6 is a block diagram of another BMS including the fault management system, according to some embodiments.

Referring now to FIG. 6, a block diagram of another building management system (BMS) 600 which includes a fault management system for connected equipment is shown, according to some embodiments. BMS 600 can include many of the same components as BMS 400 and BMS 500 as described with reference to FIGS. 4 and 5. For example, BMS 600 is shown to include building 10, network 446, client devices 448, and fault management system 502. Building 10 is shown to include connected equipment 610, which can include any type of equipment used to monitor and/or control building 10. Connected equipment 610 can include connected chillers 612, connected AHUs 614, connected actuators 616, connected controllers 618, or any other type of equipment in a building HVAC system (e.g., boilers, economizers, valves, dampers, cooling towers, fans, pumps, etc.) or building management system (e.g., lighting equipment, security equipment, refrigeration equipment, etc.). Connected equipment 610 can include any of the equipment of HVAC system 100, waterside system 200, airside system 300, BMS 400, and/or BMS 500, as described with reference to FIGS. 1-5.

Connected equipment 610 can be outfitted with sensors to monitor particular conditions of the connected equipment 610. For example, chillers 612 can include sensors configured to monitor chiller variables such as chilled water return temperature, chilled water supply temperature, chilled water flow status (e.g., mass flow rate, volume flow rate, etc.), condensing water return temperature, condensing water supply temperature, motor amperage (e.g., of a compressor, etc.), variable speed drive (VSD) output frequency, and refrigerant properties (e.g., refrigerant pressure, refrigerant temperature, condenser pressure, evaporator pressure, etc.) at various locations in the refrigeration circuit. Similarly, AHUs 614 can be outfitted with sensors to monitor AHU variables such as supply air temperature and humidity, outside air temperature and humidity, return air temperature and humidity, chilled fluid temperature, heated fluid temperature, damper position, etc. In general, connected equipment 610 monitor and report variables that characterize the performance of the connected equipment 610. Each monitored variable can be forwarded to network control engine 608 as a data point (e.g., including a point ID, a point value, etc.).

Monitored variables can include any measured or calculated values indicating the performance of connected equipment 610 and/or the components thereof. For example, monitored variables can include one or more measured or calculated temperatures (e.g., refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, resource consumptions (e.g., power consumption, water consumption, electricity consumption, etc.), control setpoints, model parameters (e.g., regression model coefficients, etc.), and/or any other time-series values that provide information about how the corresponding system, device, and/or process is performing. Monitored variables can be received from connected equipment 610 and/or from various components thereof. For example, monitored variables can be received from one or more controllers (e.g., BMS controllers, subsystem controllers, HVAC controllers, subplant controllers, AHU controllers, device controllers, etc.), BMS devices (e.g., chillers, cooling towers, pumps, heating elements, etc.), and/or collections of BMS devices.

Connected equipment 610 can also report equipment status information. Equipment status information can include, for example, the operational status of the equipment, an operating mode (e.g., low load, medium load, high load, etc.), an indication of whether the equipment is running under normal or abnormal conditions, a fault code, and/or any other information that indicates the current status of connected equipment 610. In some embodiments, equipment status information reported by the connected equipment 610 is in the form of status codes. For example, four types of status codes can be reported by a connected equipment (e.g., chiller), including safety shutdown codes (safety codes), warning codes, cycling codes, and operation codes. Monitored variables and status codes can be referred to as real timeseries data, which may encompass virtual points or calculated metrics.

In some embodiments, each device of connected equipment 610 includes a control panel. The control panel can use the sensor data to shut down the device if the control panel determines that the device is operating under unsafe conditions. For example, the control panel can compare the sensor data (or a value derived from the sensor data) to predetermined thresholds. If the sensor data or calculated value crosses a safety threshold, the control panel can shut down the device and/or operate the device at a derated setpoint. The control panel can generate a data point when a safety shut down or a derate occurs. The data point can include a safety fault code which indicates the reason or condition that triggered the shut down or derate.

Connected equipment 610 can provide monitored variables and equipment status information to a network control engine 608. Network control engine 608 can include a building controller (e.g., BMS controller 366), a system manager (e.g., system manager 503), a network automation engine (e.g., NAE 520), or any other system or device of building 10 configured to communicate with connected equipment 610. In some embodiments, the monitored variables and the equipment status information are provided to network control engine 608 as data points. Each data point can include a point ID and/or a point value. The point ID can identify the type of data point and/or a variable measured by the data point (e.g., condenser pressure, refrigerant temperature, fault code, etc.). Monitored variables can be identified by name or by an alphanumeric code (e.g., Chilled_Water_Temp, 7694, etc.). The point value can include an alphanumeric value indicating the current value of the data point (e.g., 44° F., fault code 4, etc.).

Network control engine 608 can broadcast the monitored variables and the equipment status information to a remote operations center (ROC) 602. ROC 602 can provide remote monitoring services and can send an alert to building 10 in the event of a critical alarm. ROC 602 can push the monitored variables and equipment status information to a reporting database 604, where the data is stored for reporting and analysis. Fault management system 502 can access database 604 to retrieve the monitored variables and the equipment status information.

In some embodiments, fault management system 502 is a component of BMS controller 366 (e.g., within FDD layer 416). For example, fault management system 502 can be implemented as part of a METASYS® brand building automation system, as sold by Johnson Controls Inc. In other embodiments, fault management system 502 can be a component of a remote computing system or cloud-based computing system configured to receive and process data from one or more building management systems. For example, fault management system 502 can connect the connected equipment 610 (e.g., chillers 612) to the cloud and collect real-time data for over a number of points (e.g., 50 points) on those equipment. In other embodiments, fault management system 502 can be a component of a subsystem level controller (e.g., a HVAC controller, etc.), a subplant controller, a device controller (e.g., AHU controller 330, a chiller controller, etc.), a field controller, a computer workstation, a client device, and/or any other system and/or device that receives and processes monitored variables from connected equipment 610.

Fault management system 502 may use the monitored variables and status information to predict upcoming faults (e.g., failure modes) of the connected equipment 610 and take action to prevent or mitigate such faults. The fault management system 502 is described in further detail below with reference to FIGS. 8-13. Communications between fault management system 502 and other systems and/or devices can be direct and/or via an intermediate communications network, such as network 446.

In some embodiments, fault management system 502 provides a web interface which can be accessed by service technicians 606, client devices 448, and other systems or devices. The web interface can be used to access the raw data in reporting database 604, view the results produced by the fault management system, identify which equipment is in need of preventative maintenance, and otherwise interact with fault management system 502. Service technicians 606 can access the web interface to view a list of equipment for which faults are predicted by fault management system 502. Service technicians 606 can use the predicted faults to proactively repair connected equipment 610 before a fault and/or an unexpected shut down occurs. These and other features of fault management system 502 are described in greater detail below.

Figure 7:
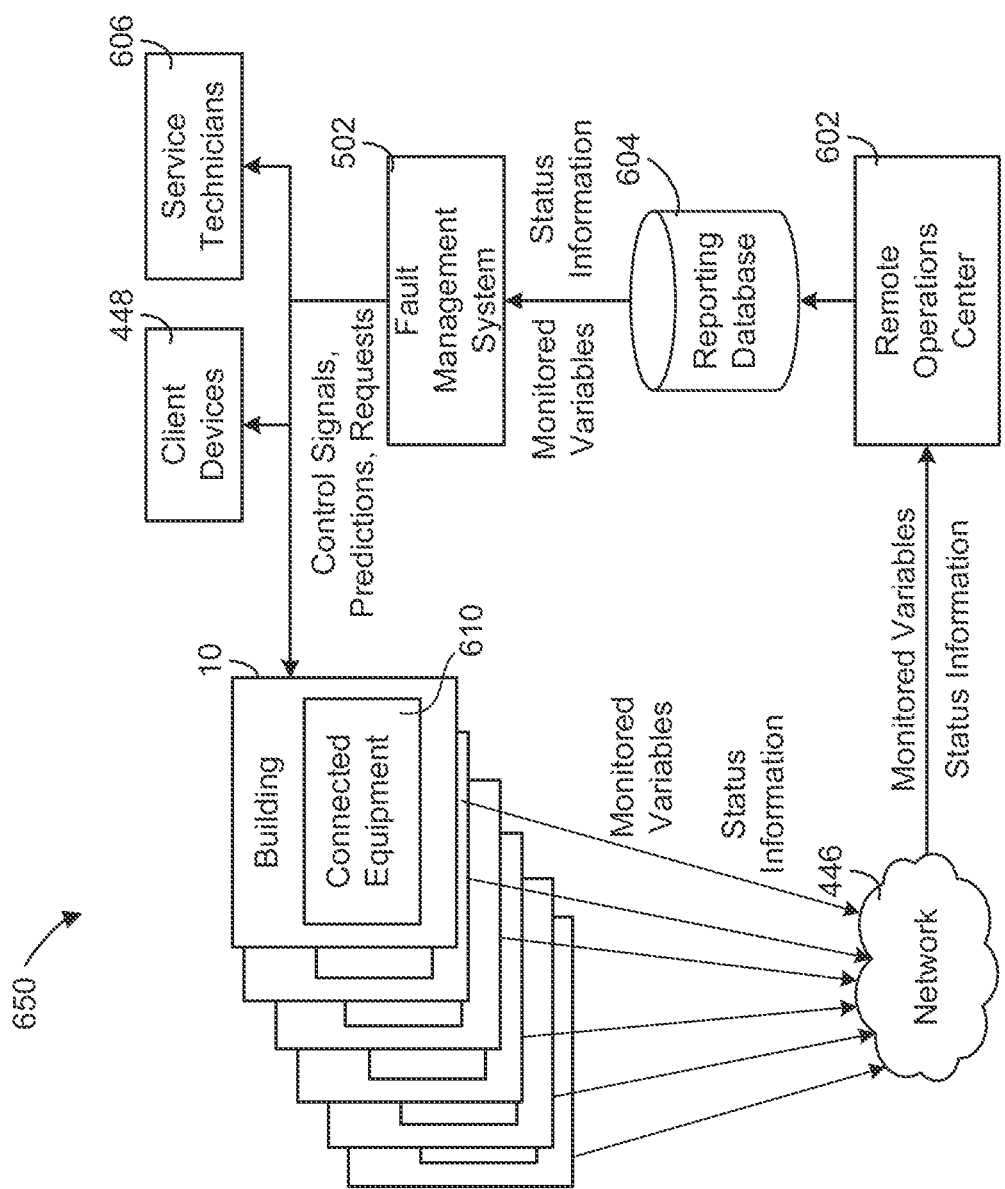
FIG. 7 is a block diagram of another BMS including the fault management system, according to some embodiments.

Referring now to FIG. 7, a block diagram of another building management system (BMS) 650 is shown, according to some embodiments. The building management system 650 of FIG. 7 includes the components of the building management system 600 of FIG. 6, plus any number of additional buildings 10 with additional groups of connected equipment 610. The multiple buildings 10 and multiple units of connected 610 can be considered as a fleet of buildings and/or equipment. The buildings 10 and connected equipment 610 can be located in one location (e.g., one campus) or multiple locations, including across geographic regions, states, provinces, territories, countries, continents, etc. FIG. 7 illustrates that the network 446 can connect all such buildings 10 and connected equipment 610 to the remote operations center 602 (e.g., via the Internet). The fault management system 502 can then be provided as a cloud-based service, for example. In other embodiments, the fault management system 502 is implemented at the edge, for example locally on unit of connected equipment 610.

Figure 8:
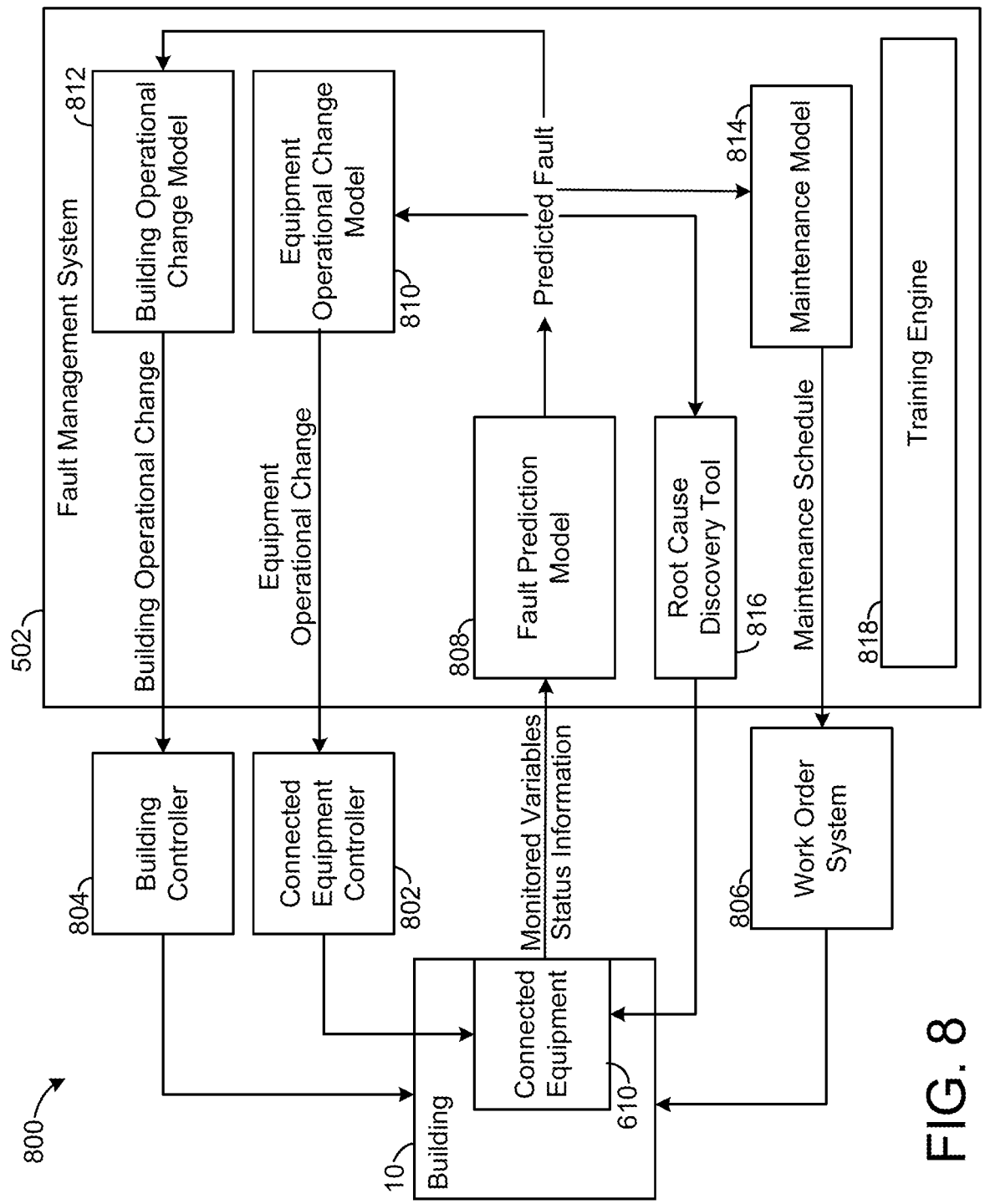
FIG. 8 is a block diagram of a system including a detailed view of the fault management system, according to some embodiments.

Referring now to FIG. 8, a block diagram of a system 800 including a detailed view of the fault management system 502 is shown, according to some embodiments. The system 800 includes the fault management system 502, the connected equipment 610 serving the building 10, a connected equipment controller 802 for the connected equipment 610, a building controller 804 for other controllable devices of the building 10, and a work order system 806. The fault management system 502 is shown as including a fault prediction model 808, an equipment operational change model 810, a building operational change model 812, a maintenance model 814, root cause discovery tool 816, and training engine 818. The fault management system 502 can be implemented as one or more processors and one or more non-transitory computer readable media storing program instructions that, when executed by one or more processors, cause the processors to perform the operations attributed herein to the fault management system 502 and components thereof. The fault management system 502 can be implemented as a cloud-based computing resource, at the edge (e.g., embedded in the connected equipment), locally at data infrastructure of the building 10, or various combinations thereof in various embodiments.

The fault prediction model 808 is shown as receiving data from and/or relating to the connected equipment 610. The data can include timeseries values for monitored variables. The data can also include status information such as status codes indicating normal operation, on/off status, fault conditions, etc. The fault prediction model 808 can stream such data continuously from the connected equipment 610 or receive batches of such data, for example.

The fault prediction model 808 is configured to predict a future fault based on the timeseries data relating to the connected equipment 610. The fault prediction model 808 can include a neural network or other artificial intelligence model trained to predict future faults. The fault prediction model 808 can work as a classifier to classify sets of timeseries data relating to the connected equipment 610 as corresponding to conditions that indicate different types of faults that will occur, in various scenarios. The fault prediction model 808 thereby outputs a predicted fault. The predicted fault output by the fault prediction model 808 can include a type of the fault, a predicted timing of the fault, a confidence in the fault prediction and/or other information relating to a future fault condition predicted to occur by the fault prediction model 808.

In some embodiments, the predicted fault from the fault prediction model 808 is communicated to the equipment operational change model 810. The equipment operational change model 810 is configured to determine an operational change for the equipment intended to and/or expected to prevent or mitigate the predicted fault. For example, changing an internal operating settings of the connected equipment 610 may help to mitigate the predicted fault (e.g., reduce consequences of the fault, reach a less severe fault condition, delay the fault condition, etc.) or prevent the predicted fault (e.g., enable continuation of normal operation).

The equipment operational change model 810 receive the monitored variables and/or status information from the connected equipment 610 and use such information in combination with the predicted fault to determine the operational change. The equipment operational change model 810 may be a neural network or other artificial intelligence model trained using an actual and/or synthetic set of timeseries data showing results of different operational changes with respect to preventing or mitigating fault conditions (e.g., trained by training engine 818). As another example, the equipment operational change model 810 can include a rules-based approach whereby predefined rules are executed to determine the operational change based on the predicted fault. As one such example, the predefined rules may indicate that a certain setpoint should be adjusted in one direction by a certain amount in response to prediction of a particular type of fault. Various such examples are possible and enable the equipment operational change model 810 to output an equipment operational change to the connected equipment controller 802 as shown in FIG. 8. In response to the equipment operational change from the fault management system 502, the connected equipment controller 802 operates the connected equipment 610 to automatically implement the equipment operational change as an automated action. The fault management system 502 thereby alters operation of the connected equipment 610 to prevent or mitigate the predicted fault.

In some embodiments, the predicted fault from the fault prediction model 808 is communicated to the building operational change model 810. The building operational change model 812 is configured to determine a building operational change intended to and/or expected to prevent or mitigate the predicted fault. The building operational changes are changes to be implemented using one or more building devices other than the connected equipment 610 of relevance in the predicted fault. For example, a building operational change can include changing a load on the connected equipment 610 (e.g., increasing or decreasing demand for a resource generated by the connected equipment 619 by changing other building setpoints), time-shifting operations of the connected equipment 610, changing environmental conditions around the connected equipment 610, changing characteristics of an input resource to the connected equipment 610, etc.

The building operational change model 812 may receive various building data, including in some examples the monitored variables and status information from the connected equipment 610, and use such information in combination with the predicted fault to determine a building operational change to prevent or mitigate the predicted fault. The building operational change model 812 may be a neural network or other artificial intelligence model trained using an actual and/or synthetic set of timeseries data showing results of different operational changes with respect to preventing or mitigating fault conditions (e.g., trained by training engine 818). As another example, the building operational change model 812 can include a rules-based approach whereby predefined rules are executed to determine the operational change based on the predicted fault. As one such example, the predefined rules may indicate that a certain building setpoint should be adjusted in one direction by a certain amount in response to prediction of a particular type of fault. Various such examples are possible and enable the building operational change model 812 to output an equipment operational change to the building controller 808 as shown in FIG. 8. In response to the building operational change from the fault management system 502, the building controller 802 operates the building 10 (e.g., one or more building devices in building 10) to automatically implement the building operational change as an automated action. The fault management system 502 thereby alters operation of the building 10 to prevent or mitigate the predicted fault of the connected equipment 610.

In some embodiments, the predicted fault from the fault prediction model 808 is provided to the maintenance model 814. The maintenance model 814 is configured to determine a maintenance schedule intended to and/or expected to prevent or mitigate the predicted fault, for example in an optimal manner. The maintenance schedule can define one or more maintenance actions to be taken at one or more future times, for example by one or more service technicians. The maintenance actions can include maintenance on the connected equipment 610 and/or on other elements of the building 10.

The maintenance model may receive various other data inputs, including monitored variables and status information from the connected equipment, service technician schedules, parts availability and lead time information, and/or maintenance budget information, etc. and use such information in combination with the predicted fault from the fault prediction model 808 to determine a maintenance schedule for the building 10.

The maintenance model 814 may be a neural network or other artificial intelligence model trained using an actual and/or synthetic set of timeseries data showing results of different maintenance actions with respect to preventing or mitigating fault conditions (e.g., trained by training engine 818). As another example, the maintenance model 814 can include a rules-based approach whereby predefined rules are executed to determine the operational change based on the predicted fault. As one such example, the predefined rules may indicate that a certain maintenance action should be performed before predicted occurrence of a particular type of fault to prevent the fault. Various such examples are possible and enable the maintenance model 814 output a maintenance schedule to the work order system 806 as shown in FIG. 8. In response to the maintenance schedule from the fault management system 502, the work order system 806 causes the scheduled maintenance to be performed, for example by automatically generating a work order for the scheduled maintenance and transmitting such orders to technicians, automatically ordering required tools or parts for performing the scheduled maintenance, etc. The fault management system 502 thereby causes performance of maintenance actions to prevent or mitigate the predicted fault.

FIG. 8 shows the fault management system 502 as also including a root cause discovery tool 816. The root cause discovery tool 816 is shown as receiving the predicted fault from the fault prediction model 808 and as being in communication with the connected equipment 610. The root cause discovery tool 816 may perform various operations to diagnose the root cause of a predicted fault, occurring fault, or previous fault. In some examples, the root cause discovery tool 816 is configured to perform experiments by altering operation of the connected equipment 610 and/or other elements of the building 10 to generate information that can help indicate the root cause of a fault. The root cause discovery tool 816 may also be configured to determine whether an equipment operational change, a maintenance action, or a building operational change is most suitable to (e.g., most likely, most reliable, most efficient, etc.) preventing or mitigating a predicted fault, and coordinate operation of the various elements of the fault management system 502 accordingly (e.g., to cause implementation of the most suitable solution while causing omission of operation of other components). In various embodiments, one or more of the root cause discovery tool 816, maintenance model 814, building operational change model 812, and equipment operational change model 810 are omitted.

The fault management system 502 is also shown as including training engine 818. The training engine 818 can be adapted to train, tune, generate, update, adjust, etc. the fault prediction model 808, the equipment operational change model 810, the building operational change model 812, and/or the maintenance model 814 in various embodiments. The training engine 818 can implement supervised or unsupervised training approaches in various embodiments, for example using a generative adversarial network (GAN), including a conditional embedder generative adversarial network (CEGAN) as described below. The training engine 818 can access various data from and relating to the connected equipment 610 and the building 10 and use such data for development and adjustment of various elements of the fault management system 502 in various embodiments.

Multi-Label Sequence Classification Problem

Figure 9:
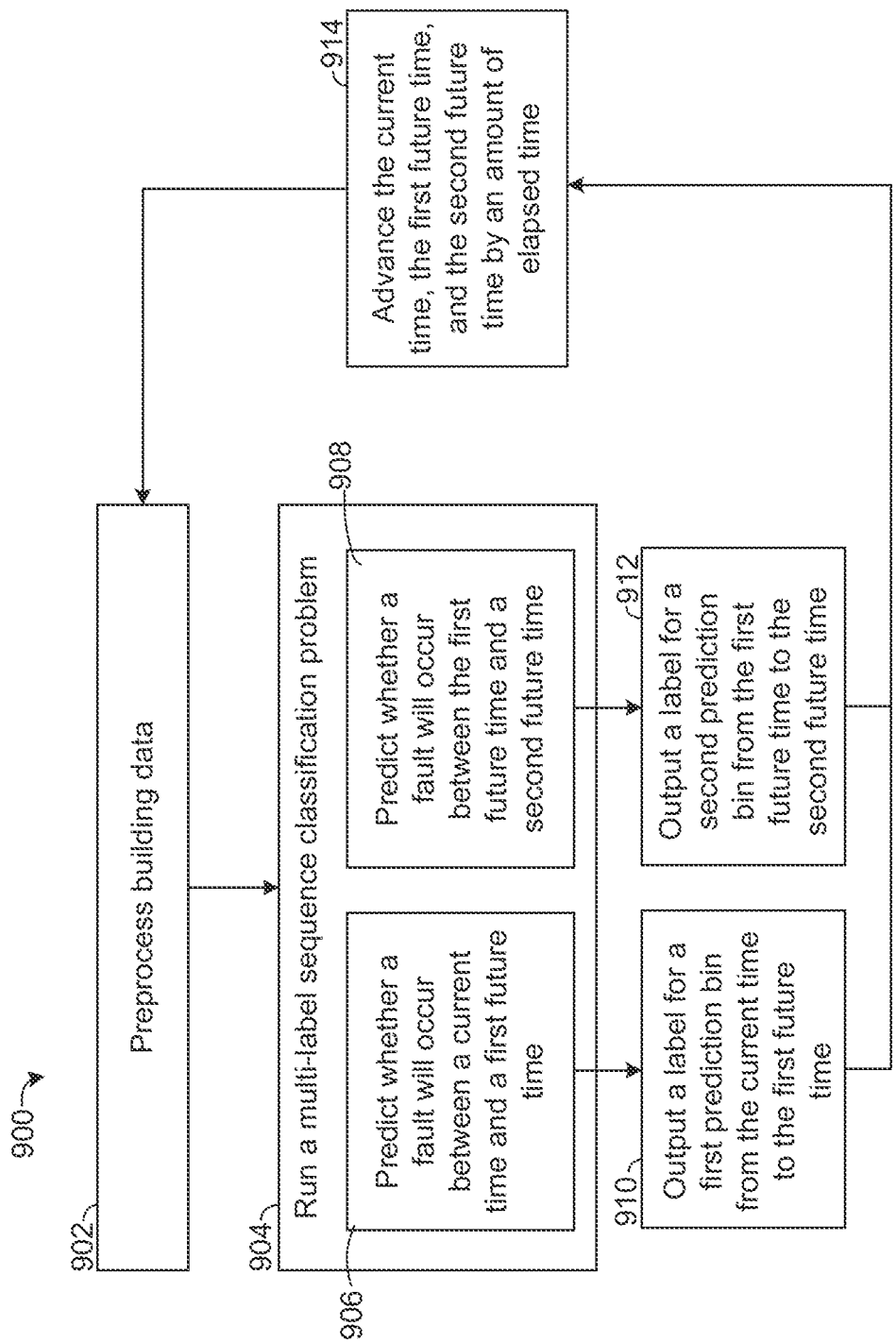
FIG. 9 is a flowchart a process can be executed by the fault management system, according to some embodiments.

Referring now to FIG. 9, a flowchart of a process 900 that can be executed by the fault management system 502 using the fault prediction model 808 is shown, according to some embodiments. FIG. 9 illustrates an embodiments where the fault prediction (shutdown prediction, in some embodiments) problem is formulated as a multi-label sequence classification problem. In particular, the fault prediction problem is formulated such that the fault prediction model 808 predicts whether the a fault will occur in multiple separate prediction bins, for example a first prediction bin corresponding to upcoming day (e.g., between zero hours and twenty-four hours from a current time) and in a second prediction bin corresponding to a subsequent day (e.g., between twenty-four hours and forty-eight hours from a current time). In some embodiments, the prediction bins correspond to different time periods as in many examples herein, while in some embodiments the prediction bins correspond to different fault types (different fault codes), and the prediction bins may be defined by a time period and a subset of fault types. Two or more prediction bins can be used in various embodiments, and the prediction bins may be adjacent, overlapping, and/or spaced-apart in various embodiments. Each prediction may be independent of other predictions. In some embodiments, the example of FIG. 9 assumes fixed sequence lengths with a constant sample rate. Predictions may be performed on a rolling basis, for example at intervals shorter than durations of the prediction bins (e.g., every four hours, every six hours), which may result in data overlap across the predictions.

As shown in FIG. 9, process 900 initiates at step 902, where building data is preprocessed. The building can include various monitored variables and status codes relating to connected equipment 610, for example. For example, the data can include timeseries sensor measurements (e.g., temperatures, pressures, flows, etc.), timeseries safety shutdown codes, and other timeseries status indicators. Preprocessing in step 902 can include transforming data into a standardized form that can be consumed by one or more prediction models, for example because raw data may be irregularly sampled with missing points whereas prediction models may use fixed sequence lengths and sample times with no missing values. Step 902 may include transforming raw timeseries data into input tensors suitable for use by prediction models, for example. Preprocessing in step 902 can be based on tunable parameters such as sequence lengths and missing data tolerances. Step 902 can include various operations described in detail below with reference to FIGS. 12-15 in various embodiments.

Figure 16:
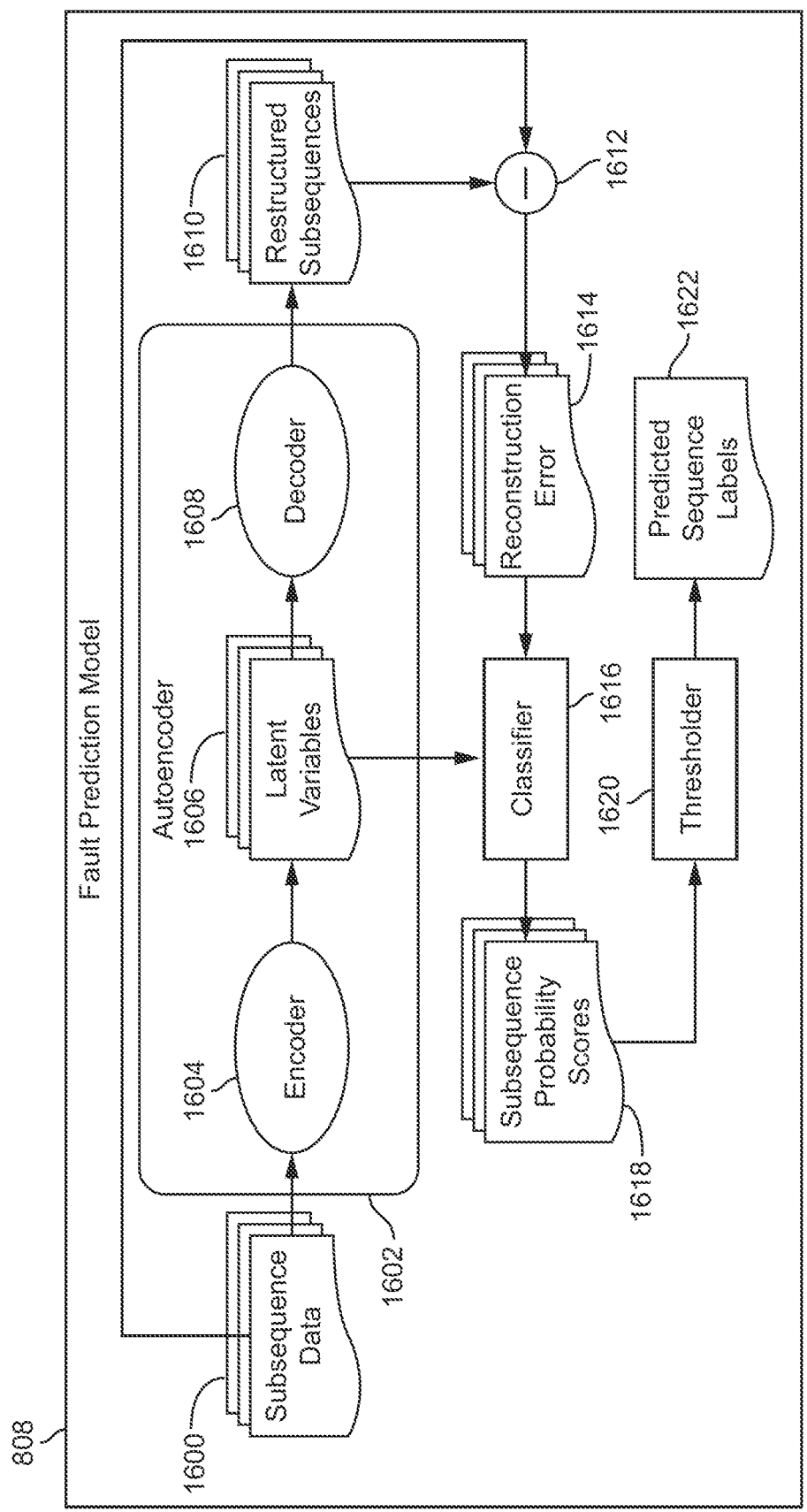
FIG. 16 is a diagram of a fault prediction model, according to some embodiments.

At step 904, a multiple-label sequence classification problem is solved using the preprocessed building data. FIG. 9 illustrates that step 904 includes two predictions (e.g., two classifications, two labels assign through solving the multiple-label classification problem) corresponding to two prediction bins, shown as substep 906 and substep 908. Additional predictions for additional prediction bins may be included in other embodiments. Substep 906 is shown as including predicting whether a fault will occur between a current time and a first future time, while substep 908 is shown as including predicting whether a fault will occur between the first future time and a second future time. The first future time may be twenty-four hours from now and the second future time may be forty-eight hours from now, for example. Step 904 (including substep 906 and substep 908) can be performed by applying the input data to the fault prediction model 808, for example a modular fault prediction model configured as shown in FIG. 16 and described in detail with reference thereto below. One model can be configured to provide labels for a both a first prediction bin (i.e., the current time to the first future time as shown for substep 906) and a second prediction bin (i.e., the first future time to the second future time as shown for substep 906) such that a single multi-label sequence classification problem is solved in step 904, for example.

At step 910, a label is output for the first prediction bin, i.e., from the current time to the first future time. The label indicates whether a fault is predicted to occur during the first prediction bin, i.e., before the first future time. In some embodiments, the label also indicates a type of the predicted fault or other information about the prediction (e.g., a probability that the fault will occur, etc.). The label can be provided to one or more of various elements of the fault management system 502 (e.g., equipment operational change model 810, building operational change model 812, maintenance model 814) for use in preventing or mitigating the predicted fault, if a fault is predicted to occur for the first prediction bin.

At step 912, a label is output for the second prediction bin, i.e., from the first future time to the second future time. The label indicates whether a fault is predicted to occur during the second prediction bin, i.e., between the first future time and the second future time. In some embodiments, the label also indicates a type of the predicted fault or other information about the prediction (e.g., a probability that the fault will occur, etc.). The label can be provided to one or more of various elements of the fault management system 502 (e.g., equipment operational change model 810, building operational change model 812, maintenance model 814) for use in preventing or mitigating the predicted fault, if a fault is predicted to occur for the second prediction bin. The fault management system 502 and elements thereof such as the equipment operational change model 810, building operational change model 812, maintenance model 814 can be configured to provide different actions in response to a predicted fault depending on whether it is predicted to occur in the first prediction bin (in which case an urgent intervention may be implemented) or in the second prediction bin (in which case a slower intervention may be implemented) (or in any other prediction bin in embodiments involving more than two prediction bins).

At step 914, as time progresses, the current time, the first future time, and the second future time (and, accordingly, the first prediction bin and the second prediction bin) are advanced by an amount of elapsed time. The process can then loop through steps 902-912 to output labels for the advanced first prediction bin and the advanced second prediction bin. Step 914 may be performed every four hours (or every hour, every six hours, every eight hours, etc.) so that steps 902-912 are executed every four hours (or every hour, every six hours, every eight hours, etc.) to output labels every four hours (or every hour, every six hours, every eight hours, etc.) for prediction bins that advance by four hours (or one hour, six hours, eight hours, etc.) at each iteration. Fault predictions for both an upcoming period and a subsequent period can thus be repeatedly output from the fault prediction model 808 for use in the fault management system 502, for example.

Figure 10:
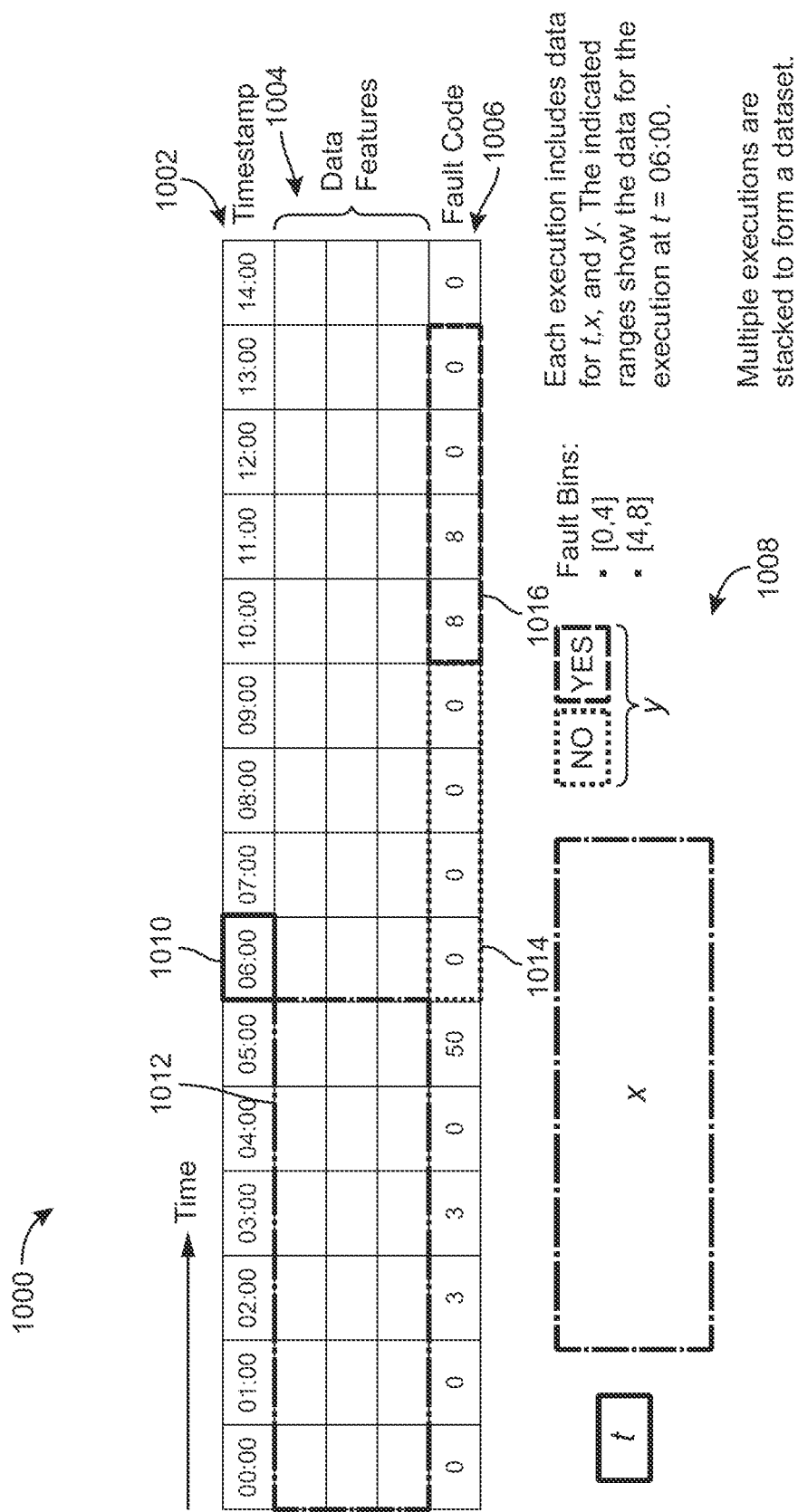
FIG. 10 is an illustration of prediction bins that can be used in an example embodiment of the process of FIG. 9, according to some embodiments.

Referring now to FIG. 10, an illustration 1000 of prediction bins that can be used in an example embodiment of process 900 is shown according to some embodiments. The illustration 1000 shows a chart including a time stamp row 1002 showing a sequence of times (e.g., a column for each hour), data rows 1004 representing input data to a model (e.g., output from step 902), and a fault code row 1006 representing fault labels output from the fault prediction model 808 (e.g., at step 910 and/or step 912). As indicated by key 1008, a first box 1010 demarcates a current time t (shown as 6:00) by encircling a cell in the time stamp row 1002. A second box 1012 demarcates the data x used for fault prediction at the current time t indicated by the first box 1010, and, as shown, encircles all cells of the data rows 1004 from before the current time t to the beginning of the illustration 1000 (shown as 0:00). In the example shown, the second box 1012 indicates that the data x used for fault prediction are from six preceding hours. A third box 1014 demarcates fault labels output for a first prediction bin, in particular from the current time (shown 6:00) to a first future time (shown as 10:00), encircling entries in the fault code row 1006 for corresponding hours. A fourth box 1016 demarcates labels output for a second prediction bin, in particular form the first future time (shown as 10:00) to a second future time (shown as 14:00). The data from box 1012 is used to generate the information in both the third box 1014 and the fourth box 1016, i.e., to predict faults for two different prediction bins. FIG. 10 thus illustrates an example where each prediction bin has a duration of four hours. The second box 1012, third box 1014, and fourth box 1016 will maintain their durations and slide forward as time elapses.

In the example shown, all entries in the third box 1014 are zero, indicating that no faults are predicted to occur in the first prediction bin (i.e., before 10:00 in the example shown). The fourth box 1016 includes non-zero entries, indicating that a fault is predicted to occur in the second prediction bin. In the example shown, fault codes of "8" appear in the fourth box, indicating that a corresponding type of fault is predicted to occur. Other fault codes (e.g., other integers) may be generated for other types of faults. The fault codes appear in only a subset of entries in the fourth box 1016 as shown, such that granular predictions (e.g., hourly predictions) may be made in some embodiments. In some embodiments, the more granular predictions are aggregated to provide a prediction for an entirety of the prediction bin, which may be more reliable than the more granular predictions.

FIG. 10 thereby illustrates an example illustration of steps 904-912 of process 900, for example. Performing step 914 as time advances may shift the first box 1010, the second box 1012, the third box 1014, and the fourth box 1016 to the right along the illustration by the same amount (e.g., by an amount of time elapsed). The sequencing illustrated in FIG. 10 is thus repeatable and generalizable to different start times (i.e., other than 6:00 as shown). As shown, the predictions are made for bins of four hour duration. Other embodiments use prediction bins of different sizes (e.g., two hours, 6 hours, 8 hours, 12 hours, 24 hours, 2 days, 1 week, etc.) and other numbers of prediction bins (e.g., three, four, five, ten, twenty, etc.).

Training Engine

Figure 11:
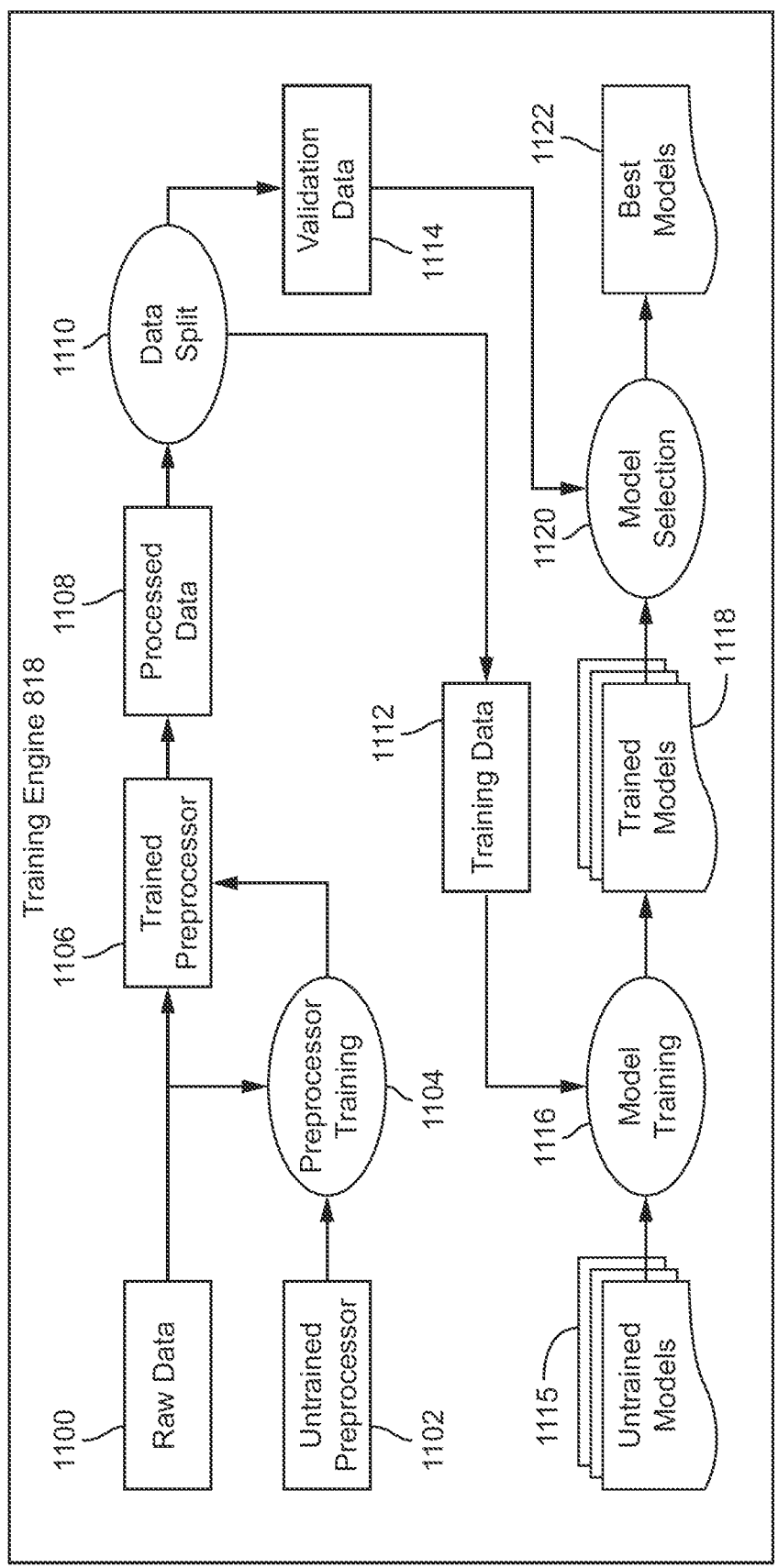
FIG. 11 is a block diagram of a training engine of the fault management system, according to some embodiments.

Referring now to FIG. 11, a block diagram of the training engine 818 is shown, according to some embodiments. The block diagram of FIG. 11 shows a flow-type diagram showing a process for using raw data to arrive at a trained model, for example a trained fault prediction model 808, which can then be used as described with reference to FIG. 8.

As shown in FIG. 11, raw data 1100 is fed into preprocessor training 1104, which also receives an untrained preprocessor 1102. The raw data 1100 may be monitored variables and status information from connected equipment 610, for example. The preprocessor training 1104 executes operations to train the untrained preprocessor 1102 and outputs trained preprocessor 1106. Preprocessor training 1104 may include various supervised and unsupervised machine learning techniques in various embodiments, for example.

Figure 12:
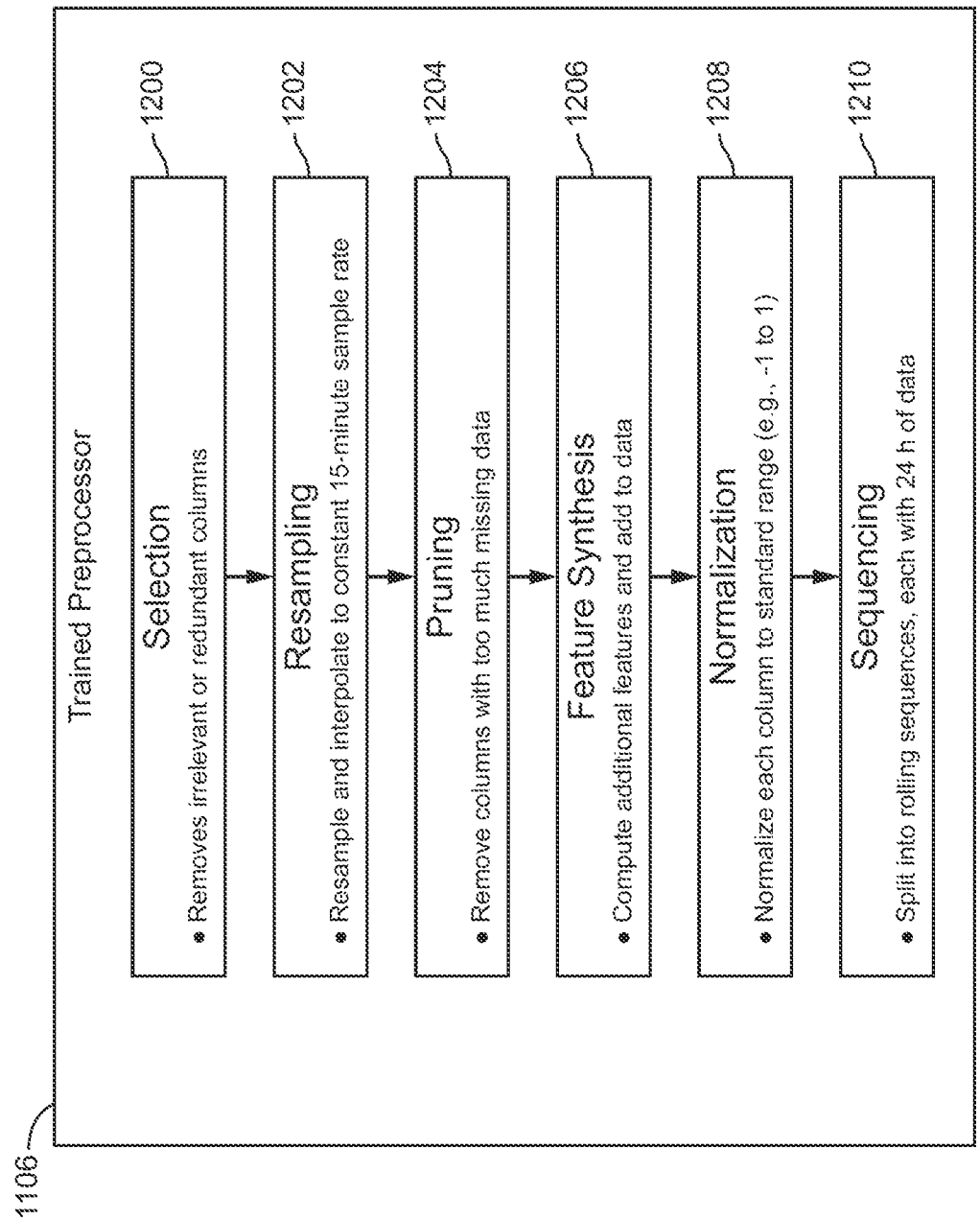
FIG. 12 is a diagram of a trained preprocessor, according to some embodiments.

The trained preprocessor 1106 is shown as also receiving the raw data 1100, for example raw data 1100 corresponding to a later or separate time as used by preprocessor training 1104. The trained preprocessor 1106 operates (as trained by preprocessor training 1104) to output processed data 1108. The trained preprocessor 1106 can execute one or more of various preprocessing steps, for example as shown in FIG. 12 and described in detail with reference thereto below. For example, the processed data 1108 may be selected to remove irrelevant content, resampled and interpolated to ensure constant sample rate across data points, pruned to remove portions with too much missing data, augmented by calculated features, normalized, and sequenced.

The processed data 1108 is divided at data split 1110 into training data 1112 and validation data 1114. Data split 1110 can determine how to divide the data. For example, processed data 1108 from before a determined time step can be used as training data 1112 while processed data 1108 from after the determined time step can be used a validation data 1114. The data split 1110 may split the data evenly or may use a higher proportion of the data as training data 1112 (e.g., 80%) as compared to validation data 1114 (e.g., 20%).

Figure 17:
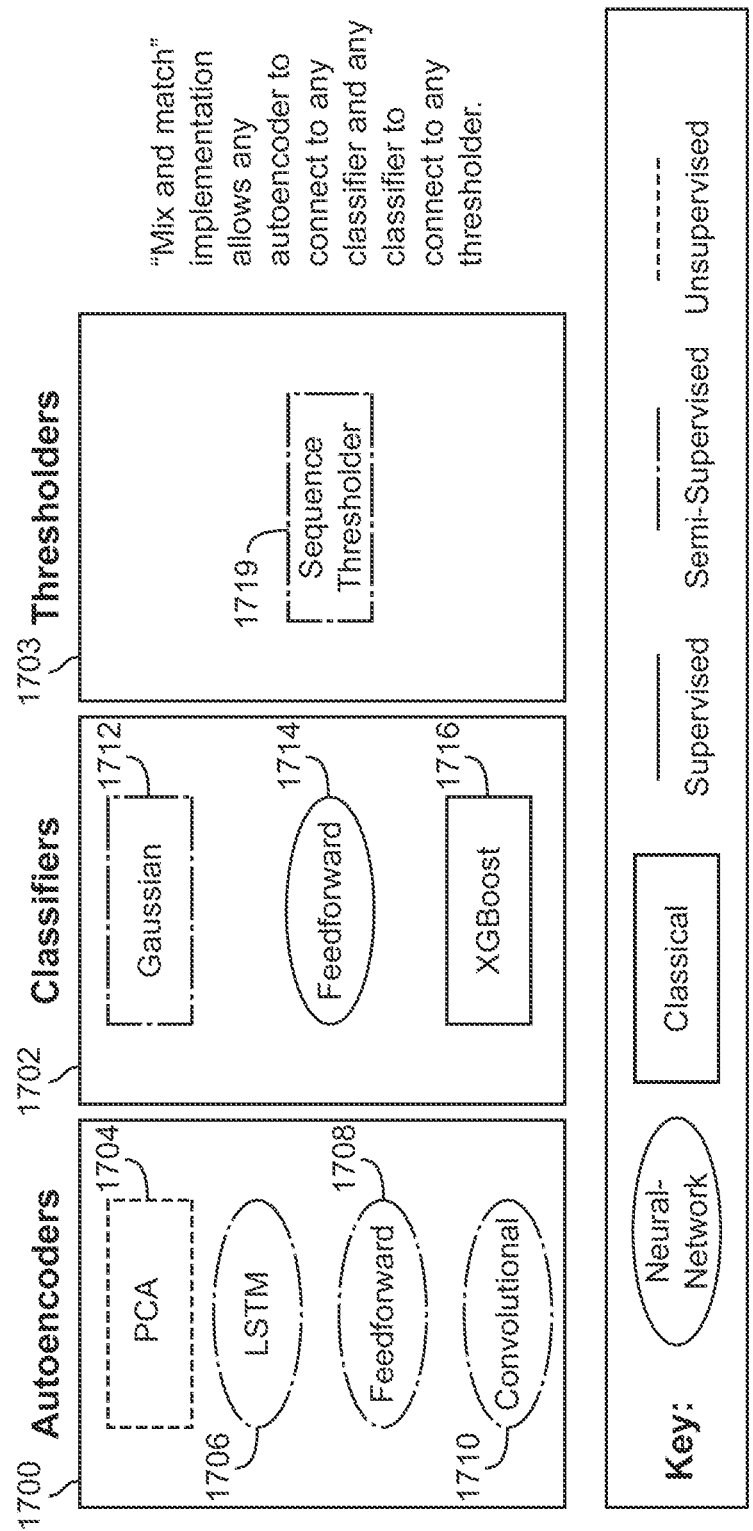
FIG. 17 is an illustration of possible module components of the fault prediction model, according to some embodiments.

The training data 1112 is provided to model training 1116, which also receives untrained models 1115. Model training 1116 includes using the training data 1112 to train the untrained models 1115. The untrained models 1115 can include various different fault prediction models 808 for example made up of different selection of modular autoencoders, classifiers and/or thresholders as shown in FIGS. 16-17 and described with reference thereto. Model training 1116 can include composite training of a classifier and an autoencoder, for example, such that the autoencoder becomes focused on features relevant to the classification, e.g., relevant to equipment faults. Such model training 1116 is applied to a variety of untrained models 1115 in order to produce a corresponding number of trained models 1118 as an output of model training 1116.

The trained models 1118 are received by model selection 1120, which also receives validation data 1114. Model selection 1120 uses the validation data 1114 to assess and compare performance of the trained models 1118. For example, the validation data 1114 can be used to assess the accuracies of fault predictions by the trained models 1118. Based on comparison of performance of the trained models 1118 as assessed using the validation data 1114, model selection 1120 can select the best model 1122 (e.g., the best performing model, the model with the most accurate predictions, etc.). The best model 1122 may be output from the training engine 818 for use as the fault prediction model 808 for use as shown in FIG. 8.

Referring now to FIG. 12, a diagram of the trained preprocessor 1106 is shown, according to some embodiments. FIG. 12 illustrates a combination of preprocessing steps that can be executed by the trained preprocessor 1106 to preprocess the raw data for use by other elements of the training engine 818. The trained preprocessor 1106 is shown as include steps or blocks for selection 1200, resampling 1202, pruning 1204, features synthesis 1206, normalization 1208, and sequencing 1210. One or more of selection 1200, resampling 1202, pruning 1204, features synthesis 1206, normalization 1208, and sequencing 1210 may include an algorithm (e.g., artificial intelligence algorithm, neural network, etc.) trained, fit, identified, etc. in preprocessor training 1104.

To provide selection 1200, the trained preprocessor removes irrelevant or redundant columns from the raw data 1100. For example, some points (variables, etc.) may be irrelevant to certain fault predictions, for example because no physical, causal, or other link is present between such points and faults for the equipment of interest. Corresponding redundant columns of data can thus be removed (not selected) at selection 1200. As another example, some points may be redundant, for example providing effectively the same data as other points or able to be calculate based on some combination of other points. To reduce data and computational complexity, such redundant data can be removed at selection 1200 without losing the corresponding information. Selection 1200 thereby selects an appropriate subset of the available points (variables, status codes, etc.) in the raw data 1100.

Figure 13:
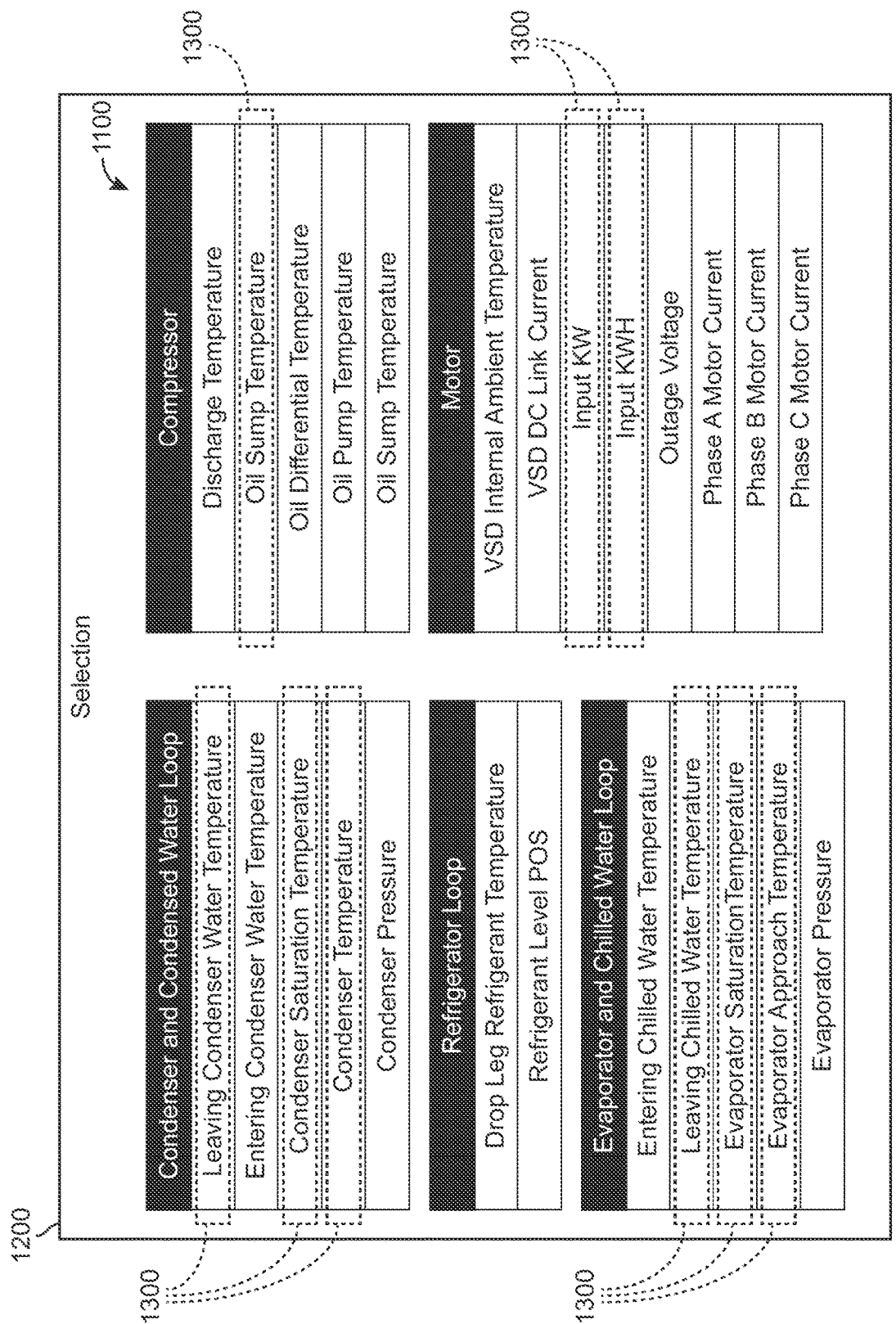
FIG. 13 is an illustration of a selection feature of the trained preprocessor, according to some embodiments.

An example illustration of selection 1200 according to some embodiments is shown in FIG. 13. FIG. 13 shows all of the points available in raw data 1100, arranged in to categories for condenser and condensed water loop, refrigeration loop, evaporator and chilled water loop, compressor, and motor, as in some embodiments. FIG. 13 further illustrates that selection 1200 can select a subset of such points for removal, for example those indicated by boxes 1300. By removing some or all of the points indicated by boxes 1300, redundant and irrelevant data can be removed and not used, thereby improving the efficiency of later calculation, reducing computational complexity, etc. For example, because a condenser approach temperature is equal to condenser saturation temperature minus leaving condenser water temperature, one of those three points can be removed in selection 1200 of data preprocessing without loss of information. Various such examples of points to be selected or removed at selection 1200 of the preprocessor 1106 are possible in various embodiments.

The trained preprocessor 1106 is also shown as executing resampling 1202. Resampling 1202 includes resampling and interpolating to achieve a constant sample rate within the training data, for example a sample rate of 15 minutes. Different variables may be measured by equipment, sensors, etc. at different constant or irregular rates, such that the sample rate requires standardization by the preprocessor 1106 in order to have a common rate across variables. Gaps may also exist in the raw data (i.e., time steps without data for certain variables). Achieving a constant sample rate enables reliability and efficiency of later calculations using the processed data.

Figure 14:
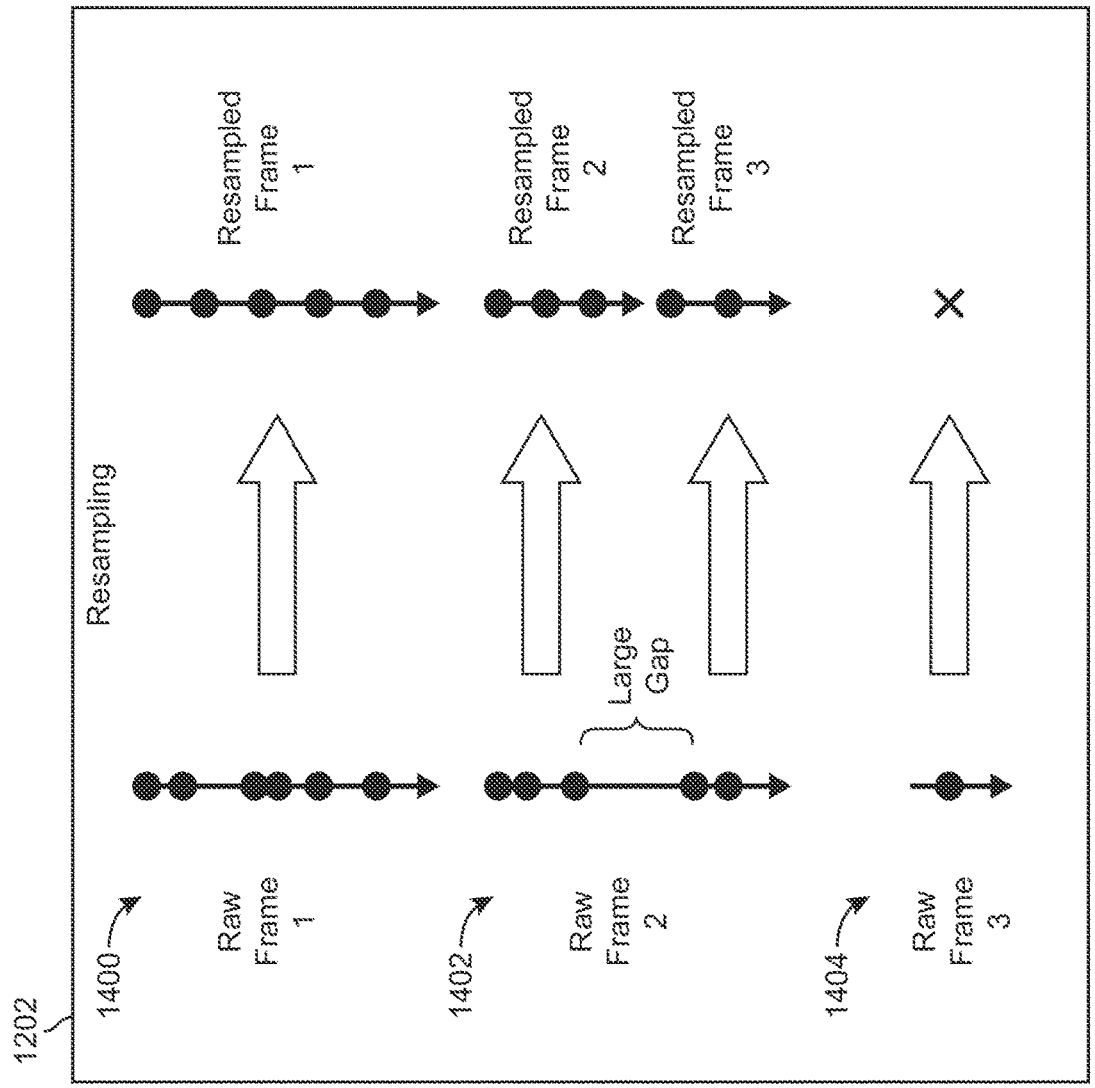
FIG. 14 shows illustrations of resampling features of the trained preprocessor, according to some embodiments.

FIG. 14 illustrates example operations that can be executed as part of resampling 1202. In a first illustration 1400, FIG. 14 illustrates that resampling 1202 can include respacing raw data from an irregular sample rate onto a standardized, constant sample rate. Such an operation can include modifying time steps associated with samples in the raw data. For example, a closest value of the raw data to each time step of the standard constant sample rate can be taken and associated with such time step to form the resampled data. In a second illustration 1402, FIG. 14 illustrates that, in addition to resampling as in the first illustration 1400, a large gap with no samples may be excised from the data. In a third illustration 1406, FIG. 14 illustrates that a frame with insufficient data can be discarded. In some embodiments, gaps are filled by interpolating data from neighboring time steps to achieve samples for all variable for all time steps in the processed data. Various such examples for implementation of resampling 1202 are possible.

Still referring to FIG. 12, the trained preprocessor 1106 is also shown as executing pruning 1204. Pruning 1204 can be executed to remove columns with too much missing data. For example, pruning 1204 may remove columns if more than a present fraction of samples are missing. The missing fraction may be calculated after resampling 1202, such that small gaps have been corrected but large gaps are retained in the data set assessed at the stage of pruning 1204. Pruning 1204 provides a maximal amount of useful data while eliminating sections of missing or incorrect data (e.g., empty fields, data that are not a number (NaNs), etc.) that could not be handled by machine learning models in later steps of training and use of the processed data.

The trained preprocessor 1106 is also shown as executing feature synthesis 1206. Feature synthesis 1206 can include computing additional features and including those additional features in the processed data 1108. The synthetic features may be derived from connected equipment fault rules and defined by a simple rules-based logic, for example a temperature or difference in temperature exceeding a threshold value (e.g., chilled water supply temperature minus evaporator saturation temperature exceeding a threshold) or some other logic. Synthetic features can be fault labels or codes. The synthetic features may also be a performance indicator calculated based on other data, for example a connected equipment performance index or chiller performance index, which may be calculated as CPI=100−SAF-CODE×30−WAR-CODE×10−CYC-CODE×10−Health-Alert×10−Health-Alarm×20 in some embodiments. Execution of feature synthesis 1206 provides the processed data 1108 with domain knowledge, which is then passed forward to the machine learning models.

FIG. 12 shows the trained preprocessor 1106 as also executing normalization 1208. Normalization 1208 can include normalizing each column to a standard range, for example between −1 and 1. Normalization 1208 can be achieved via affine transformation (E.g., shifting and scaling) and may be configured to avoid sensitivity to outliers. Various implementation strategies can be implemented. For example, a median can be set to zero and the interquartile range to 1. As another example, the minimum can be set to −1 and the maximum set to 1. As another example the mean is set to zero and the standard deviation is set to 1. In other examples, normalization 1208 is provided within untrained models 1115 and/or trained models 1118 so that data is normalized in the manner most appropriate for the corresponding type of model.

The trained preprocessor 1106 is further shown as executing sequencing 1210. Sequencing 1210 arranges the data as fixed-length sequences with associated timeseries fault labels. Sequencing can use rolling horizons throughout the available data and screen out executions with missing data. Sequencing 1210 may produce a 2D sequence to classify and a 1D vector of ground-truth labels for each execution. For example, sequences may have a length of 96 samples (e.g., 24 hours at a 15 minute sample rate) and may be associated with two fault labels (e.g., a fault label for the next day and a fault label for the day subsequent to the next day; for a first prediction bin and a second prediction bin).

Figure 15:
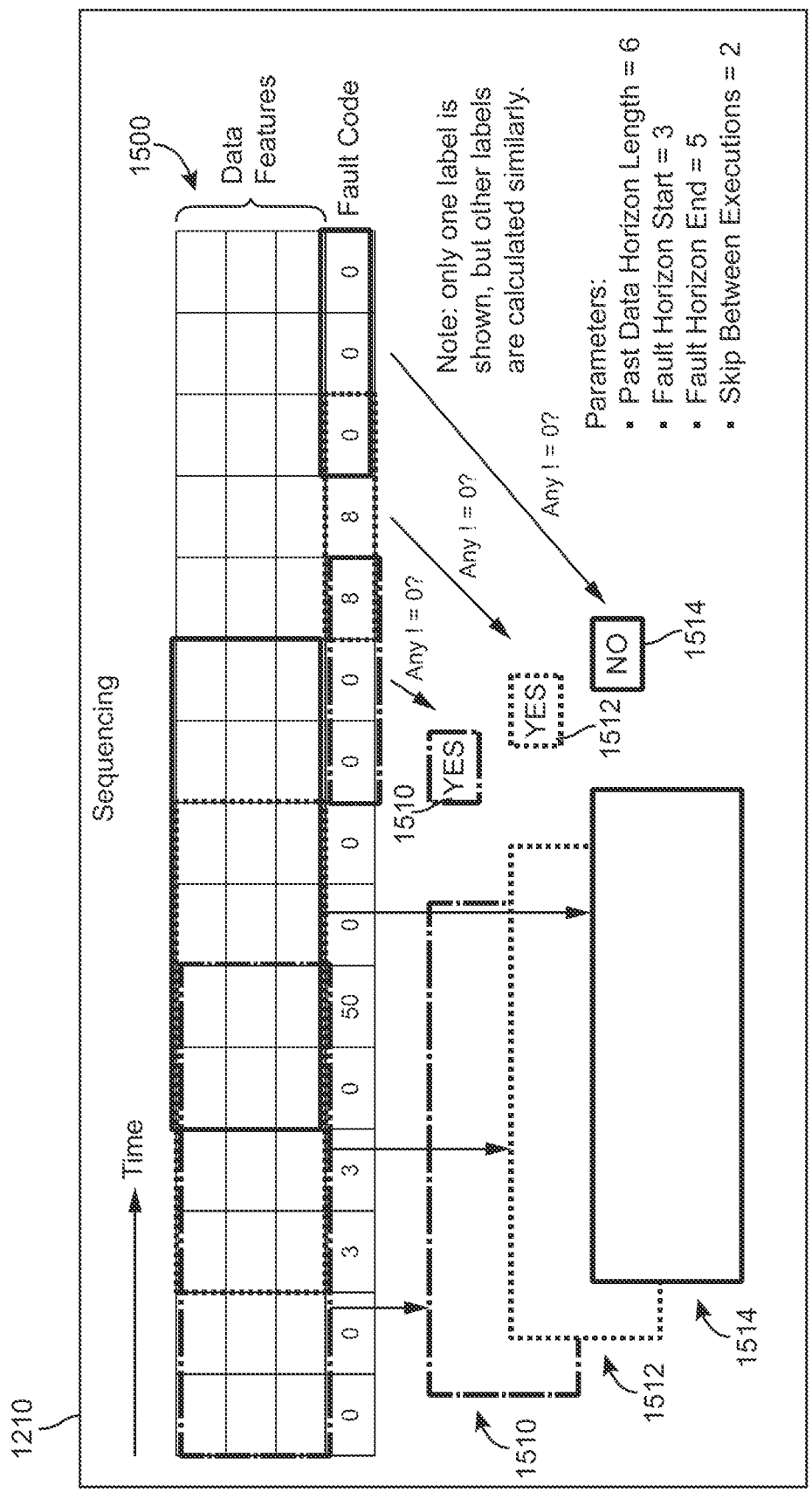
FIG. 15 illustrates sequencing features of the trained preprocessor, according to some embodiments.

An example illustration of the organization that may be performed for sequencing 1210 is shown in FIG. 15. FIG. 15 shows sequencing 1210 of a set of data depicted by table 1500 into three sequences, shown as a first sequence, a second sequence, and a third sequence. The first sequence is defined by data from time steps delineated by a first type of box 1510 (i.e., delimited by a first dash pattern in FIG. 15) and fault labels delineated by the first type of box 1510 (i.e., delineated with the same first dash pattern), with the first type of box 1510 encircling later time steps for the fault codes as compared to for the feature data. A fault (or lack thereof) indicated in the first type of fault box is thereby associated with earlier feature data which would be usable for predicting such a fault (or lack thereof). The second sequence is defined by data from time steps delineated by a second type of data box 1512 (i.e., a second dash type) and fault labels delineated by the second type of data box 1512, with the second type of data box 1512 encircling faults for times later than the feature data encircled by the second type of data box 1512. All instances of the second type of data box 1512 are advanced by the same amount of time relative to instances of the first type of data box 1510. The third sequence is defined by data from time steps delineated by a third type of data box 1514 (shown as a solid bold line) and fault labels also defined by the third type of data box 1514, with the third type of data box 1514 circling fault codes for later times than the feature data encircled by the third type of data box 1514. All instances of the third type of data box 1514 are advanced by the same amount of time relative to instances of the second type of data box 1512. FIG. 15 shows one fault label associated with each sequence, whereas various examples contemplated herein include an additional fault label associated with each sequence and pulled from data for subsequent prediction bins. By executing sequencing 1210, the trained preprocessor can output processed data 1108 arranged in sequences of time series data such that the time dependency useful for making future-looking predictions of faults by a fault prediction model is represented in the processed data 1108. While the example of FIG. 15 shows only one fault prediction bin for each sequence, in other embodiments two or more fault bins could be included for each sequence to enable predictions for multiple future prediction bins (e.g., as in FIG. 10).

Model Structure

Referring now to FIG. 16, the fault prediction model 808 is shown, according to some embodiments. In the example of FIG. 16, the fault prediction model 808 uses subsequence data 1600 with an autoencoder 1602 which includes an encoder 1604 providing latent variables 1606 to a decoder 1608. The fault prediction model 808 is also shown as including a node 1612 which receives reconstructed subsequences 1610 from the decoder 1608 and the subsequence data 1600 and provides reconstruction error 1614 to a classifier 1616 of the fault prediction model 808, with the classifier 1616 also arranged to receive latent variables 1606 from the autoencoder 1602. The classifier 1616 is shown as outputting subsequence probability scores 1618 to a thresholder 1620 of the fault prediction model 808, with the thresholder 1620 outputting predicted sequence labels 1622. Features relating to latent variables are disclosed in U.S. Patent Publication No. 2018/02084701, which is incorporated by reference herein in its entirety.

The subsequence data 1600 may be pre-processed using a similar approach as described above for the trained preprocessor 1106 of the training engine 818. As such, the subsequence data maybe of a standard sample rate, free of gaps, selected to a set of relevant data, augmented with synthesized features, pruned, and sequenced, all of which enables efficient and reliable use of the subsequence data 1600 by the fault prediction model 808.

The autoencoder 1602 is configured to construct a latent representation of input sequences. The autoencoder 1602 includes an encoder 1604 and a decoder 1608 as shown in FIG. 16. As shown in FIG. 17, the autoencoder 1602 can be modularly selected from a set of types of autoencoders including, for example, a principle component analysis model 1704, a long short-term memory model 1706, a feedforward neural network 1708, and a convolutional neural network 1710. The autoencoder 1602 can be any of such types of autoencoders in various embodiments and to create different model forms (e.g., multiple untrained models 1115) within a particular implementation for comparison and selection of a best model form by the training engine 818, in some examples.

Figure 18:
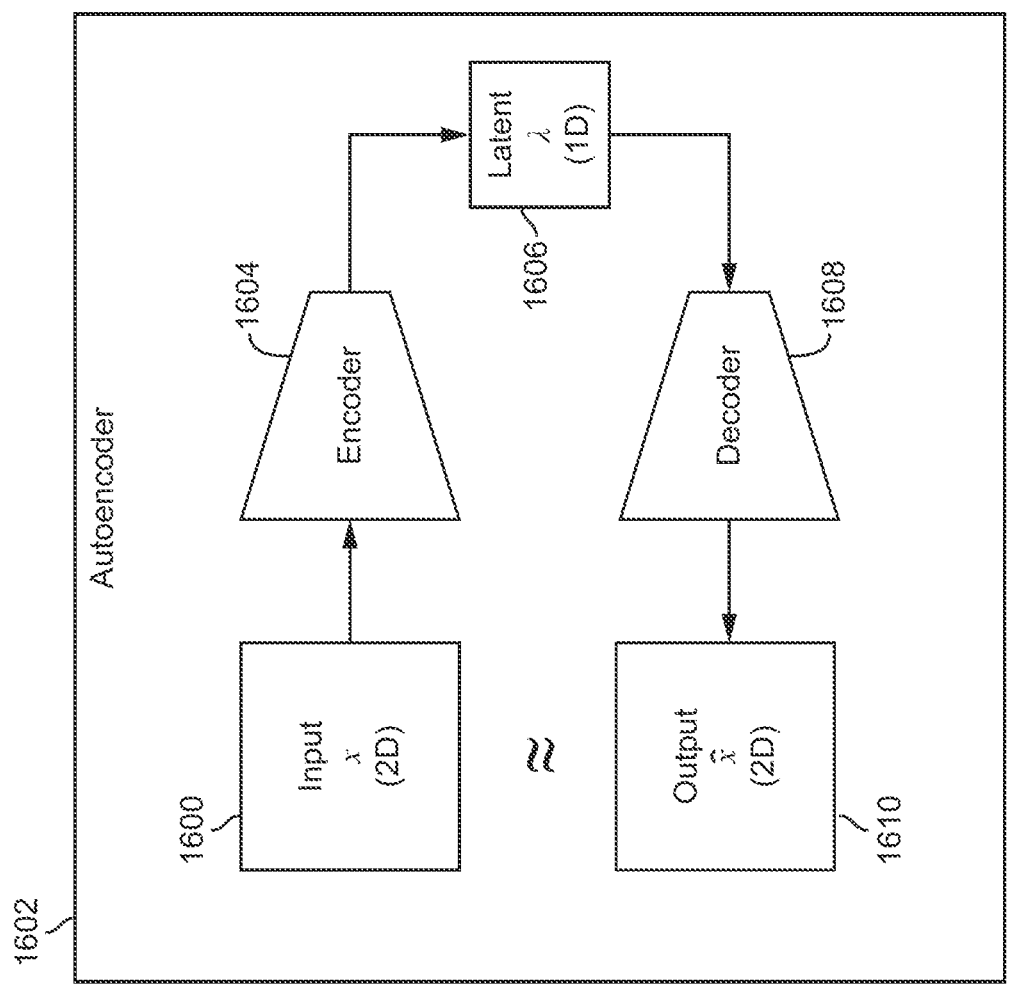
FIG. 18 is an illustration of an autoencoder, according to some embodiments.

The autoencoder 1602 is further illustrated in FIG. 18, according to some embodiments. As shown in FIG. 18, the encoder 1604 receives an input 1600, shown as a two-dimensional input x. The encoder 1604 encodes the input as latent variable(s) 1606, shown as a one-dimensional latent variable λ. The encoder 1604 thereby reduces the dimensionality of the input to create the latent variable (or variables in higher-dimensioned examples), for example so that the latent variable(s) 1606 has a tenth to a hundredth of the number of dimensions as the input. The decoder 1608 receives the latent variable(s) 1606 and decodes the latent variable(s) 1606 to provide an output 1610 (reconstructed subsequences) having the same dimensionality as the input 1600 (shown as two-dimensional output x̂). The decoder 1608 attempts to create the output 1610 from the latent variable(s) 1606 so that the output 1610 matches the input 1600. The encoder 1604 and the decoder 1608 can be trained via a semi-supervised process, for example, to improve the ability of the encoder 1604 to encode information in the latent variable(s) 1606 with minimal information loss while also improving the ability of the decoder 1608 to extract the higher-dimension output information from the latent variables(s) 1606. Such training can be done minimization of a reconstruction error $|\in|$ for $\in := \hat{x} - x$. The latent variable(s) 1606 and/or the reconstruction error $\in$ can be used by the classifier 1616 for classification/scoring as shown in FIG. 16, such that dimensionality of the inputs handled by the classifier 1616 are lower than the original input subsequence data 1600.

Still referring to FIG. 16, the classifier 1616 is shown as receiving latent variables 1606 and reconstruction error 1614 from the autoencoder 1602. The classifier 1616 is configured to classify input data 1600 (i.e., based on latent variables 1606 and/or reconstruction error 1614) as normal or faulty via a continuous probability score (e.g., from normal at zero to faulty at one). The classifier 1616 may provide a multi-label binary classification, where each label gets an independent probability score. The classifier 1616 may or may not share internal variables across different labels, dependent on model type. The classifier 1616 can be modularly selected from a set of types of classifiers, for example set of classifiers 1702 shown in FIG. 17 including Gaussian classifier 1712, feedforward classifier 1714, and XGBoost classifier 1716. The Gaussian classifier 1712 is semi-supervised, takes a sample average of normal data, and outputs negative log likelihood as a probability score. The feedforward classifier 1714 and the XGBoost classifier 1716 are supervised, optimize model parameters to minimize binary cross-entropy, and output logits as the probability score. The classifier 1616 can be any of such types of classifiers in various embodiments and to create different model forms (e.g., multiple untrained models 1115) within a particular implementation for comparison and selection of a best model form by the training engine 818, in some examples.

The classifier 1616 and the autoencoder 1602 can be trained together in a composite training technique, for example when both the autoencoder 1602 and the classifier 1616 are neural networks. The classifier 1616 and the autoencoder 1602 can be first trained separately and then fine-tuned together, for example. The training for the autoencoder 1602 can be formulated as $$\min_{\theta_E,\theta_D} |x - \hat{x}| \, s.t. \; \lambda = \text{Encoder}(x, \theta_E),$$

$\hat{x}=\text{Decoder}(\lambda, \theta_D)$. The training for the classifier 1616 may be formulated as $$\min_{\theta_C} \Sigma_i y_i \log(p_i) \, s.t. \, p = \text{Classifier}(\lambda, \theta_C).$$

The composite training may be formulated as $$\min_{\theta_E,\theta_C} \Sigma_i y_i \log(p_i) \, s.t. \; \lambda = \text{Encoder}(x, \theta_E),$$

$p=\text{Classifier}(\lambda, \theta_C)$. Such a training process enables the autoencoder latent representation to focus on faultiness, thus enabling better fault predictions. The classifier 1616 is thereby enabled to provide a set of subsequence probability scores 1618 indicating probabilities (e.g., scores between 0 and 1) that a fault will occur.

Figure 19:
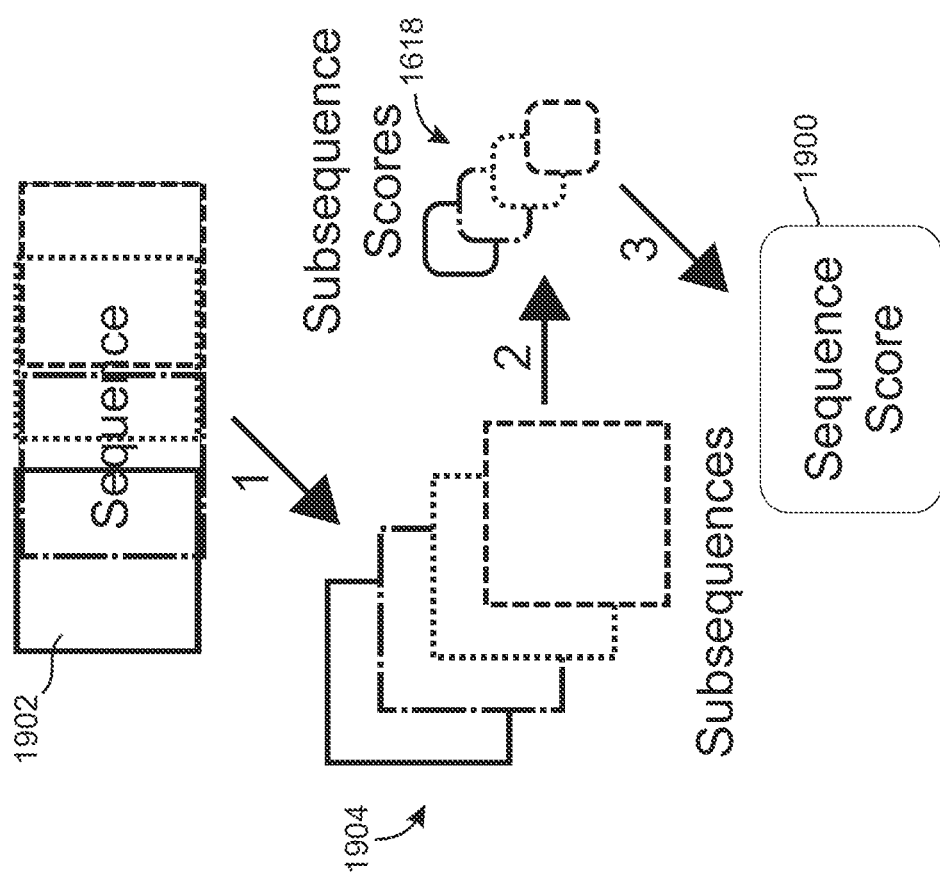
FIG. 19 is an illustration of pooling subsequence scores, according to some embodiments.

The thresholder 1620 is configured to pool subsequence probability scores to get a single score for a full sequence, for example as shown in FIG. 19. The subsequence probability scores 1618 can be combined to create a sequence score 1900 as illustrated in FIG. 19. As illustrated FIG. 19, a sequence 1902 can be divided into multiple overlapping subsequences 1904, for example as shown in FIG. 15. As one example, a sequence having a length of twelve hours can be sequenced as four overlapping six hour subsequences, each advanced by two hours relative to a preceding subsequence. The subsequences receive separate probability scores 1618 from the classifier 1616, which can then be combined (averaged, a maximum taken, etc.) by the thresholder 1620 to produce sequence score 1900. The sequence score 1900 can indicate a probability that a fault will occur based on the entire sequence 1902. The thresholder 1620 can also be modularly selected from a set as shown in FIG. 17, with the set of thresholders 1703 of FIG. 17 showing a sequence thresholder 1718 as one option that may be among other options in various embodiments.

The thresholder 1620 is also configured to convert a continuous probability score (e.g., a value between zero and one) to a binary label (e.g., faulty, normal). The thresholder 1620 can do so by setting a threshold for the probability score, such that scores above the threshold are classified as faulty and scores below the threshold are classified as normal. The threshold can be selected to maximize a true positive rate such that a false positive rate is below a configurable percentage (e.g., 5%). In some embodiments, the threshold is adapted in real time based on the results of previous predictions, for example by increasing the false-positive prediction in response to a false-positive prediction and decreasing the threshold in response to a false-negative prediction.

Figure 20:
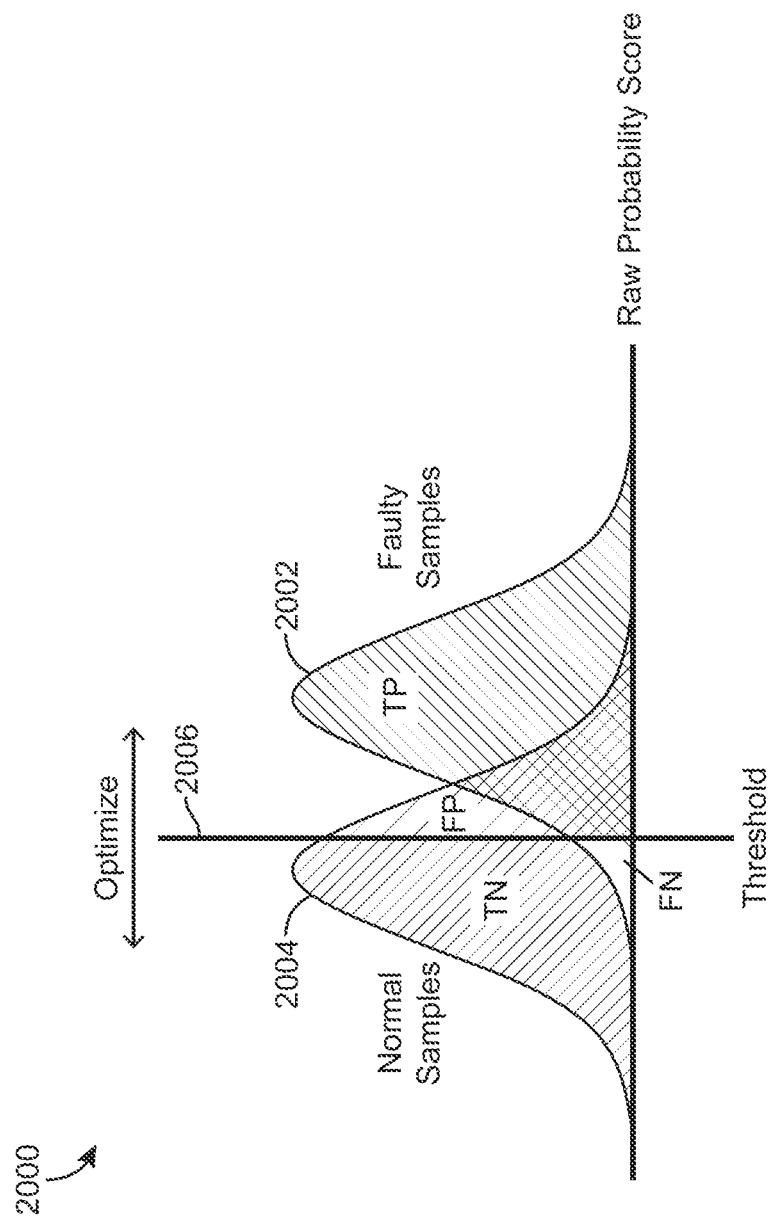
FIG. 20 is an illustration of a thresholding feature of the fault prediction model, according to some embodiments.

FIG. 20 includes a graph 2000 according to some embodiments shown that a faulty curve 2002 of probability scores for faulty samples will overlap with a normal curve 2004 of probability values for normal samples. A threshold 2006 divides the scores that are classified as normal (lower than/left of the threshold 2006) form the scores classified as faulty (higher than/right of the threshold 2006. The graph 2000 illustrates that selection of the location of the threshold 2006 will leave regions of true negative results (region TN), true positive results (region TP), false positive results (region FP), and false negative results (FN). The threshold 2006 can be adjusted depending on user preferences for experiencing extra fault predictions (i.e., higher fault positives from shifting the threshold 2006 to the left) versus experiencing more faults that are not predicted (i.e., higher false negatives from shifting the threshold 2006 to the right). In some embodiments, the thresholder 1620 is configured to automatically select the threshold 2006 to achieve some criterion, for example setting the threshold at a maximum acceptable rate of false negatives. The thresholder 1620 then applies the threshold 2006 to new, incoming sequence scores to classify the sequence as faulty or normal, with a classification as faulty indicating that an upcoming fault is predicted in a certain time frame (i.e., output as the predicted sequence labels 1622). Each sequence may include two scores so that the thresholder 1620 outputs two classifications, for example for a first upcoming period (e.g., 0 to 24 hours from a current time) and a second upcoming period (e.g., 24 to 48 hours from a current time, indicating whether a fault is predicted for the first upcoming period and whether a fault is predicted for the second upcoming period.

The predicted sequence labels 1622 are thereby output from the fault prediction model 808. The predicted sequence labels 1622 can then be used as described with reference to FIG. 8 for mitigating and/or preventing the predicted fault, including automatically in a closed-loop manner in some examples. The approaches and techniques described herein can greatly improve the accuracy, reliability of fault prediction, including over multiple sequences and for multiple future time periods.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for mitigating faults in building equipment, comprising:
    training a fault prediction model on training data comprising (1) a plurality of rolling sequences of timeseries data corresponding to overlapping segments of time and (2) for each of the plurality of rolling sequences of timeseries data, a first fault label for a first time bin after the corresponding segment of time and second fault label for a second time bin after the first time bin, wherein the method comprises preprocessing the training data by calculating synthetic features comprising the first fault label and the second fault label based on raw timeseries data and fault rules;
    predicting, with the fault prediction model, whether a fault will occur for a first prediction bin and whether the fault will occur for a second prediction bin by generating, by the fault prediction model, labels for both the first prediction bin and the second prediction bin;
    altering operation of the building equipment in a first manner if the fault is predicted to occur for the first prediction bin; and
    altering operation of the building equipment in a second manner if the fault is predicted to occur for the second prediction bin.

2. The method of claim 1, wherein preprocessing the training data further comprises resampling and interpolating to achieve a constant sample rate for a plurality of variables represented in the training data.

3. The method of claim 1, wherein preprocessing the training data further comprises splitting the training data into the plurality of rolling sequences of the time series data corresponding to the overlapping segments of time, the overlapping segments of time having a same duration.

4. The method of claim 1, wherein the fault prediction model comprises a classifier and an autoencoder.

5. The method of claim 4, further comprising providing composite training of the classifier and the autoencoder.

6. The method of claim 1, further comprising modularly constructing the fault prediction model by combining (1) an autoencoder selected from a first group comprising a principle component analysis model, a long short-term memory network, a feedforward network, and a convolutional network with (2) a classifier selected from a second group comprising a Gaussian classifier, a feedforward model, and an XGBoost model; and
    further comprising constructing a second fault prediction model using different selections from the first group and the second group as compared to the fault prediction model.

7. The method of claim 6, wherein the building equipment is a chiller.

8. One or more non-transitory computer-readable media storing program instructions, that, when executed by one or more processors, cause the one or more processors to perform operations comprising:
    training a fault prediction model on training data comprising (1) a plurality of rolling sequences of timeseries data corresponding to overlapping segments of time and (2) for each of the plurality of rolling sequences of timeseries data, a first fault label for a first time bin after the corresponding segment of time and second fault label for a second time bin after the first time bin, wherein the operations comprise preprocessing the training data by calculating synthetic features comprising the first fault label and the second fault label based on raw timeseries data and fault rules;
    predicting, with the fault prediction model for building equipment, whether a first fault will occur for a first prediction bin and whether a second fault will occur for a second prediction bin by generating, by the fault prediction model, labels for both the first prediction bin and the second prediction bin;
    altering operation of the building equipment in a first manner if the first fault is predicted to occur for the first prediction bin; and
    altering operation of the building equipment in a second manner if the second fault is predicted to occur for the second prediction bin.

9. The one or more non-transitory computer-readable media of claim 8, wherein the operations comprise processing the raw timeseries data by resampling and interpolating to achieve a constant sample rate for a plurality of variables represented in the training data.

10. The one or more non-transitory computer-readable media of claim 8, wherein the operations comprise processing the raw timeseries data by splitting the raw timeseries data into the plurality of rolling sequences corresponding to the overlapping segments of time, the overlapping segments of time have a same duration.

11. The one or more non-transitory computer-readable media of claim 8, wherein:
    the fault prediction model comprises a classifier and an autoencoder; and
    training the fault prediction model comprises providing composite training of the classifier and the autoencoder.

12. The one or more non-transitory computer-readable media of claim 8, the operations further comprising modularly constructing the fault prediction model by combining (1) an autoencoder selected from a first group comprising a principle component analysis model, a long short-term memory network, a feedforward network, and a convolutional network with (2) a classifier selected from a second group comprising a Gaussian classifier, a feedforward model, and an XGBoost model.

13. The one or more non-transitory computer-readable media of claim 12, the operations further comprising constructing a second fault prediction model using different selections from the first group and the second group as compared to the fault prediction model.

14. A unit of building equipment, comprising:
a heating, ventilation, or cooling component;
one or more processors; and
one or more non-transitory computer-readable media storing program instructions, that, when executed by the one or more processors, cause the one or more processors to perform operations comprising:
training a fault prediction model on training data comprising (1) a plurality of rolling sequences of timeseries data corresponding to overlapping segments of time and (2) for each of the plurality of rolling sequences of timeseries data, a first fault label for a first time bin after the corresponding segment of time and second fault label for a second time bin after the first time bin, wherein the operations comprise preprocessing the training data by calculating synthetic features comprising the first fault label and the second fault label based on raw timeseries data and fault rules;
predicting, with the fault prediction model at a current time, both (i) whether a fault of the unit of building equipment will occur for a first prediction bin extending from the current time to a first future time and (ii) whether the fault of the unit of building equipment will occur for a second prediction bin extending from the first future time to a second future time, by generating, by the fault prediction model, labels for both the first prediction bin and the second prediction bin as solutions to a multi-label sequence classification problem;
altering operation of the unit of building equipment in a first manner if the fault is predicted to occur for the first prediction bin; and
altering operation of the unit of building equipment in a second manner if the fault is predicted to occur for the second prediction bin.

15. The unit of building equipment of claim 14, wherein altering the operation of the unit of building equipment in the first manner comprises operating the building equipment using a changed first operating parameter of the unit of building equipment and altering the operation of the unit of building equipment in the second manner comprises operating the building equipment using a changed second operating parameter of the unit of building equipment.

16. The unit of building equipment of claim 14, the operations further comprising modularly constructing the fault prediction model by combining (1) an autoencoder selected from a first group comprising a principle component analysis model, a long short-term memory network, a feedforward network, and a convolutional network with (2) a classifier selected from a second group comprising a Gaussian classifier, a feedforward model, and an XGBoost model.

* * * * *